(12) United States Patent
Owen et al.

(10) Patent No.: US 10,507,809 B2
(45) Date of Patent: Dec. 17, 2019

(54) CONTROLLING THE OPERATION OF A VEHICLE BRAKE SYSTEM

(71) Applicant: Jaguar Land Rover Limited, Whitley, Coventry, Warwickshire (GB)

(72) Inventors: Simon Owen, Reditch (GB); Karl Richards, Leamington Spa (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 253 days.

(21) Appl. No.: 15/523,383

(22) PCT Filed: Oct. 21, 2015

(86) PCT No.: PCT/EP2015/074314
§ 371 (c)(1),
(2) Date: Apr. 29, 2017

(87) PCT Pub. No.: WO2016/066481
PCT Pub. Date: May 6, 2016

(65) Prior Publication Data
US 2017/0247023 A1     Aug. 31, 2017

(30) Foreign Application Priority Data

Oct. 30, 2014  (GB) .................................. 1419331.2

(51) Int. Cl.
*B60T 8/24* (2006.01)
*B60T 8/1766* (2006.01)
(Continued)

(52) U.S. Cl.
CPC ................ *B60T 8/241* (2013.01); *B60T 7/12* (2013.01); *B60T 8/171* (2013.01); *B60T 8/1766* (2013.01);
(Continued)

(58) Field of Classification Search
CPC ... B60T 8/241; B60T 8/72; B60T 8/58; B60T 7/12; B60T 8/171; B60T 8/1766;
(Continued)

(56) References Cited

U.S. PATENT DOCUMENTS

2005/0102085 A1* 5/2005 Sakata .................... B60T 8/172
701/72
2009/0260901 A1* 10/2009 Ishii ....................... A01D 34/78
180/6.5
(Continued)

FOREIGN PATENT DOCUMENTS

CN       101559727 A    10/2009
DE    102006031231 A1    1/2008
(Continued)

OTHER PUBLICATIONS

Chinese Office Action for Application No. 201580058660.8, dated Nov. 27, 2018, 20 pages.
(Continued)

*Primary Examiner* — Adam R Mott
(74) *Attorney, Agent, or Firm* — Reising Ethington P.C.

(57) ABSTRACT

A method of controlling the brake system of a vehicle. The method includes receiving one or more electrical signals each indicative of a value of a respective vehicle-related parameter. The method further includes detecting that the vehicle is traveling across a slope based on the value(s) of one or more of the vehicle-related parameters. The method still further includes automatically modifying the amount of brake torque being applied to at least certain of the wheels of the vehicle in response to the detection of the vehicle traveling across a slope by increasing the amount of brake torque being applied to one or more wheels on one side of
(Continued)

the vehicle, and decreasing the amount of brake torque being applied to one or more wheels on the other side of the vehicle.

18 Claims, 11 Drawing Sheets

(51) Int. Cl.
  *B60T 7/12* (2006.01)
  *B60T 8/171* (2006.01)
  *B60T 8/58* (2006.01)
  *B60T 8/72* (2006.01)

(52) U.S. Cl.
  CPC ...... *B60T 8/58* (2013.01); *B60T 8/72* (2013.01); *B60T 2210/16* (2013.01); *B60T 2210/20* (2013.01); *B60T 2210/22* (2013.01)

(58) Field of Classification Search
  CPC ............ B60T 2210/20; B60T 2210/22; B60T 2210/16; B60T 8/1755; B60T 8/24; B60T 8/26; B60T 2230/00; B60T 2230/02; B62D 6/002; B62D 6/04; B62D 11/08; B60W 10/20; B60L 7/26; F16H 2059/663
  See application file for complete search history.

(56) References Cited

U.S. PATENT DOCUMENTS

| 2010/0131141 | A1* | 5/2010 | Ryu ................. B60T 8/172 701/31.4 |
| 2013/0184931 | A1* | 7/2013 | Boss .................. B60C 11/246 701/36 |
| 2015/0232092 | A1 | 8/2015 | Fairgrieve et al. |
| 2015/0321671 | A1* | 11/2015 | Simmons ............ B60W 30/143 701/48 |

FOREIGN PATENT DOCUMENTS

| DE | 102008021523 A1 | 12/2008 |
| GB | 2492748 A | 1/2013 |
| KR | 20030016663 A | 3/2003 |
| WO | WO2014027071 A1 | 2/2014 |
| WO | WO2014146806 A1 | 9/2014 |

OTHER PUBLICATIONS

Combined Search and Examination Report for application No. GB1419331.2, dated Apr. 27, 2015, 5 pages.
International Search Report for International application No. PCT/EP2015/074314, dated Dec. 17, 2015, 6 pages.
Written Opinion for International application No. PCT/EP2015/074314, dated Dec. 17, 2015, 5 pages.
Chinese Office Action corresponding to Chinese application No. 201580058660.8, dated Jun. 3, 2019, 9 pages.

* cited by examiner

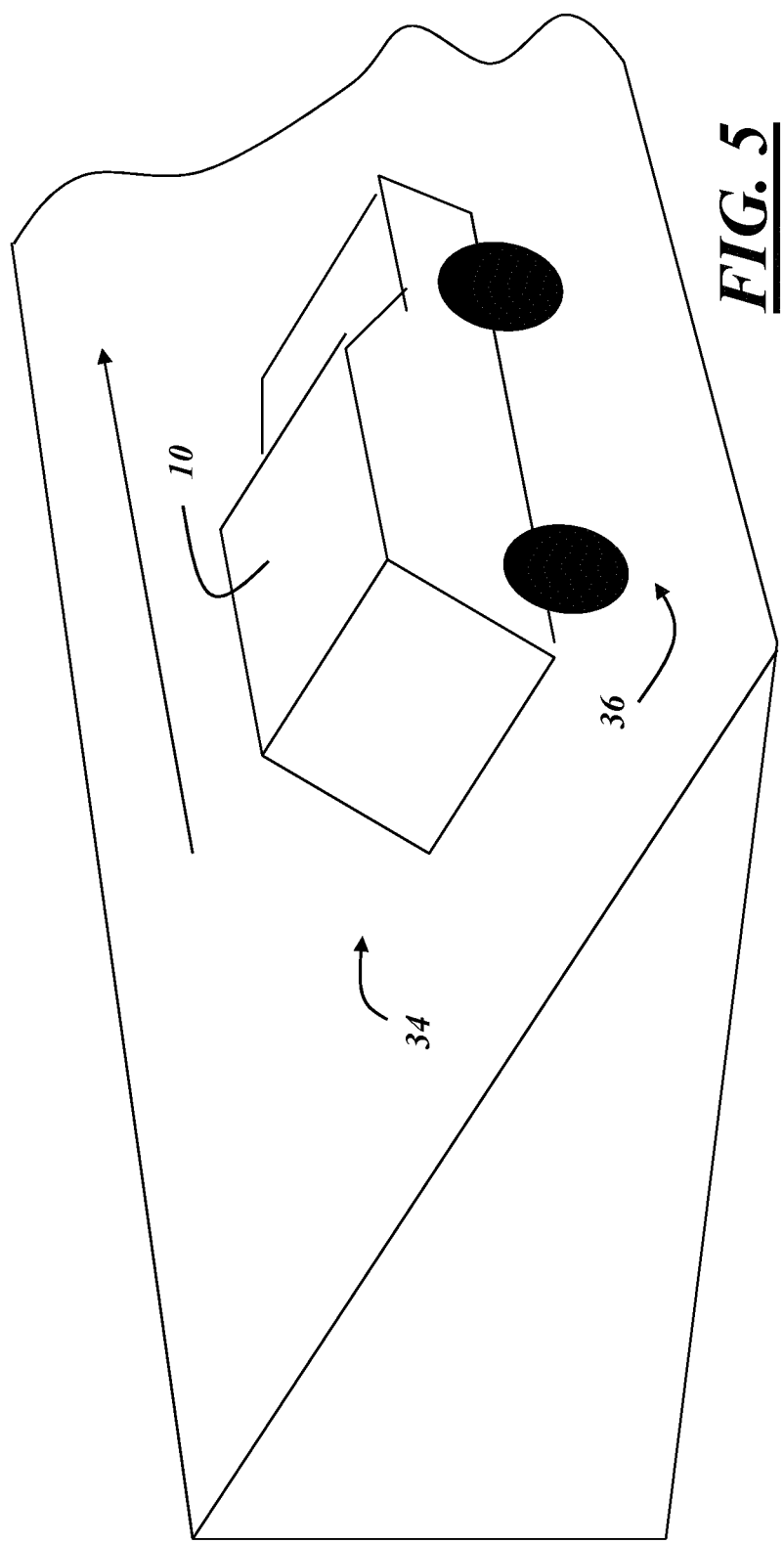

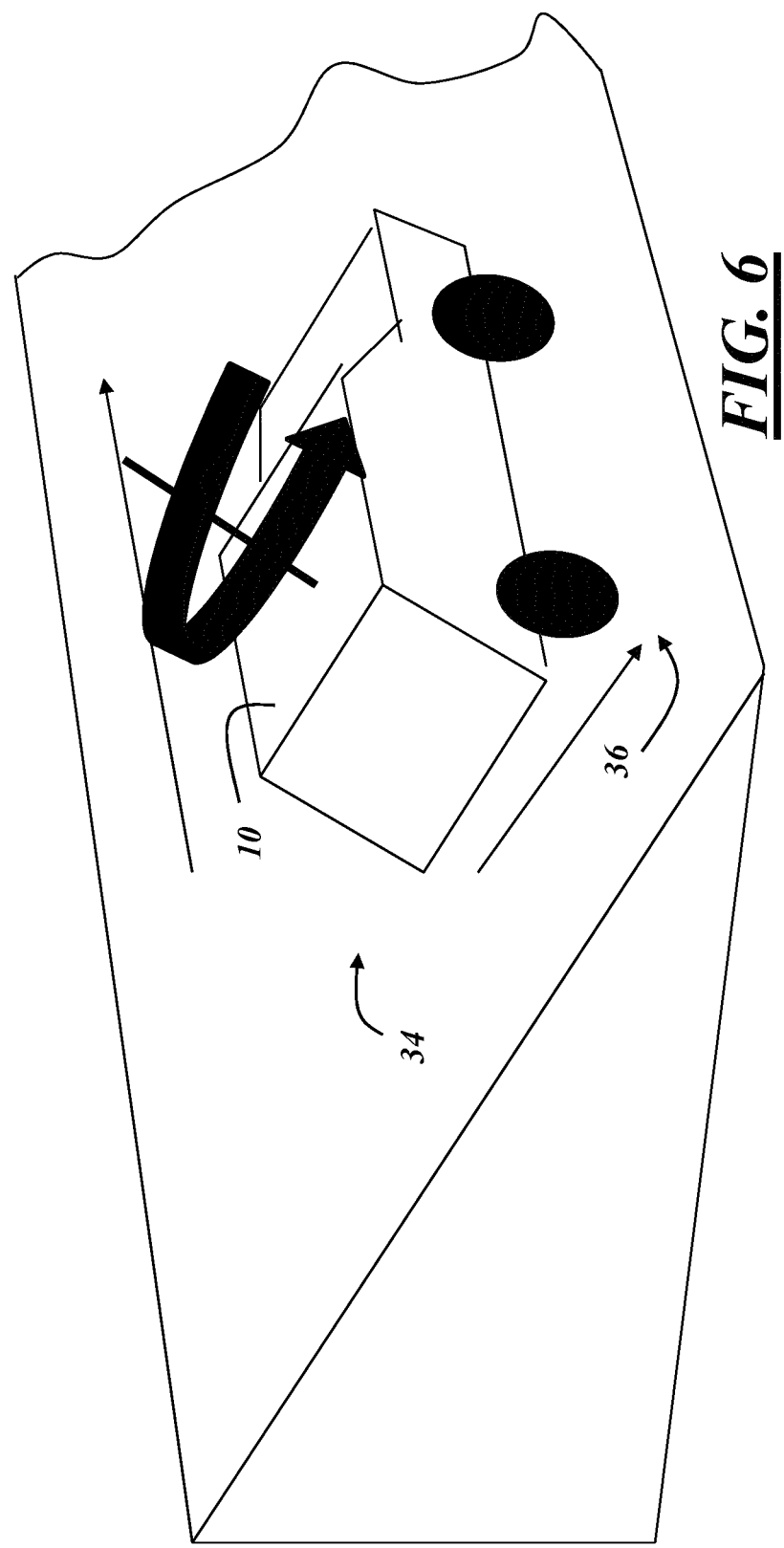

CONTROLLING THE OPERATION OF A VEHICLE BRAKE SYSTEM

TECHNICAL FIELD

The present invention relates to vehicle brake systems and particularly, but not exclusively, to automatically controlling the operation of a vehicle brake system. Aspects of the invention relate to a method, to a non-transitory computer-readable storage medium, to a system, to a vehicle, and to an electronic controller.

BACKGROUND

As a vehicle decelerates to a stop whilst traversing terrain having a deformable, low-mu surface (e.g., sand, gravel, mud, or wet grass), the wheels of the vehicle may dig or sink into the soft surface of the terrain due, at least in part, to the brake torque and drag torque respectively applied to the wheels by the vehicle brake system and the surface of the terrain. The digging or sinking of at least certain of the vehicle wheels may be compounded or made worse in an instance wherein the vehicle is decelerating to a stop as it travels across a side slope (also referred to herein as "slope" or "gradient") having a deformable, low-mu surface. More particularly, as a vehicle travels across a side slope, the weight of the vehicle is transferred to the "downhill" side of the vehicle. This weight transfer and the effect of gravity results in an increased vertical force being applied to the downhill side of the vehicle which may cause the wheels on that side of the vehicle (i.e., the "downhill wheels") to dig or sink further into the surface than those on the "uphill" side (i.e., "uphill wheels"). Additionally, in an instance where the vehicle has larger brake device components fitted to the front axle of the vehicle, the front axle may have a greater brake or negative torque applied thereto as compared to the rear axle. As such, while both the front and rear downhill wheels may dig or sink significantly into the surface, the front downhill wheel may dig or sink further than the rear downhill wheel.

The digging or sinking of the wheels of the vehicle may have a number of potentially adverse effects. For example, the digging or sinking of the downhill wheels of the vehicle may cause the vehicle to experience increased lateral movement and/or the vehicle may experience increased roll or roll rate in the downhill direction. In an instance where the front wheels dig or sink into the surface more than the rear wheels, the rear wheels may slide or drop sideways down the slope due to the soft surface and gravity. Further, as the vehicle wheels dig or sink into the surface, a substantial amount of material forming the surface may build-up around the downhill vehicle wheels. This build-up of surface material may make it more difficult to subsequently pull away in a composed manner since the vehicle must first overcome the build-up of material before progressing as desired (i.e., the vehicle wheels have to rise up through the material to a point where the tire(s)is/are on top of or at least relatively close to the surface before progressing). This may result in greater lateral movement of the vehicle and ultimately lead to the vehicle having to travel down the slope in order to gain enough momentum to progress across the slope.

Accordingly, it is an aim of the present invention to address, for example, the disadvantages identified above.

SUMMARY OF THE INVENTION

According to one aspect of the invention for which protection is sought, there is provided a method of controlling the operation of a brake system of a vehicle. In an embodiment, the method comprises: receiving one or more electrical signals each indicative of a value of a respective vehicle-related parameter; detecting that the vehicle is traveling across a slope based on the value(s) of one or more of the vehicle-related parameter(s); and automatically modifying the amount of brake torque being applied to at least certain of the wheels of the vehicle in response to the detection of the vehicle traveling across a slope by increasing the amount of brake torque being applied to one or more wheels on one side of the vehicle, and decreasing the amount of brake torque being applied to one or more wheels on the other side of the vehicle.

According to another aspect of the invention for which protection is sought, there is a provided a system for controlling the operation of a brake system of a vehicle. In an embodiment, the system comprises: means for receiving one or more signals each indicative of a value of a respective vehicle-related parameter; means to detect that the vehicle is traveling across a slope based on the value(s) of one or more of the vehicle-related parameter(s); and means to command a modification in the amount of brake torque being applied to at least certain of the wheels of the vehicle in response to the detection of the vehicle traveling across a slope by commanding an increase the amount of brake being applied to one or more wheels on one side of the vehicle, and a decrease in the amount of brake torque being applied to one or more wheels on the other side of the vehicle. In an embodiment, the system comprises an electronic processor having an electrical input for receiving the one or more signals indicative of the value(s) of the vehicle-related parameter(s); and an electronic memory device electrically coupled to the electronic processor and having instructions stored therein, wherein the processor is configured to access the memory device and execute the instructions stored therein such that it is operable to: detect that the vehicle is traveling across a slope based on the value(s) of one or more of the vehicle-related parameter(s); and command a modification to the amount of brake torque being applied to at least certain of the wheels of the vehicle by commanding an increase in the amount of brake torque being applied to one or more vehicle wheels on one side of the vehicle, and a decrease in the amount of brake torque being applied to one or more wheels on the other side of the vehicle.

According to a still further aspect of the invention for which protection is sought, there is provided an electronic controller for a vehicle having a storage medium associated therewith storing instructions that when executed by the controller cause the control of the operation of the brake system of a vehicle in accordance with the method of: receiving one or more electrical signals each indicative of a value of a respective vehicle-related parameter; detecting that the vehicle is traveling across a slope based on the value(s) of one or more of the vehicle-related parameter(s); and automatically modifying the amount of brake torque being applied to at least certain of the wheels of the vehicle in response to the detection of the vehicle traveling across a slope by increasing the amount of brake being applied to one or more wheels on one side of the vehicle, and decreasing the amount of brake torque being applied to one or more wheels on the other side of the vehicle.

According to yet another aspect of the invention for which protection is sought, there is provided a vehicle comprising the system described herein.

According to a further aspect of the invention for which protection is sought, there is provided a non-transitory, computer-readable storage medium storing instructions thereon that when executed by one or more electronic processors causes the one or more processors to carry out the method described herein.

Optional features of the various aspects of the invention are set out below in the dependent claims.

At least some embodiments of the present invention have the advantage that in an instance wherein a vehicle is traversing a side slope having deformable, low-mu surface (e.g., sand, gravel, wet grass, or mud) and is being decelerated to a stop, the distribution of the brake torque in the vehicle brake subsystem is automatically adjusted or modified by increasing the amount of brake torque being applied to one or more wheels on one side of the vehicle and decreasing the amount of brake torque being applied to one or more wheels on the other side of the vehicle (in other words, the brake bias between the two sides of the vehicle is adjusted or modified). As a result, the extent to which one or more wheels of the vehicle dig(s) or sink(s) into the surface of the slope may be effectively controlled to, for example, limit the roll or roll rate of the vehicle toward the downhill side of the vehicle and/or eliminate or at least limit the sliding of the vehicle sideways down the slope, and/or eliminate or at least limit the amount of material that builds up around the wheels of the vehicle as the vehicle comes to a stop.

Within the scope of this application it is expressly intended that the various aspects, embodiments, examples and alternatives set out in the preceding paragraphs, in the claims and/or in the following description or drawings, and in particular the individual features thereof, may be taken independently or in any combination. That is, all embodiments and/or features of any embodiment can be combined in any way and/or combination, unless such features are incompatible. The applicant reserves the right to change any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the following figures in which:

FIGS. 5-7 are illustrations of a vehicle traveling across a slope or side slope.

DETAILED DESCRIPTION

The system and method described herein may be used to automatically control the operation of a brake system of a vehicle. In an embodiment, the present systems and methods receive one or more electrical signals each indicative of a respective vehicle related parameter, detect that the vehicle is traveling across a slope or gradient based on the value(s) of the one or more vehicle-related parameter(s), and automatically modify the amount of brake torque being applied to at least certain of the wheels of the vehicle in response to the detection of the vehicle traveling across a slope by increasing the amount of brake torque being applied to one or more wheels on one side of the vehicle (i.e., uphill or downhill side), and decreasing the amount of brake torque being applied to one or more wheels on the other side of the vehicle (i.e., downhill or uphill side).

References herein to a block such as a function block are to be understood to include reference to software code for performing the function or action specified in which an output is provided responsive to one or more inputs. The code may be in the form of a software routine or function called by a main computer program, or may be code forming part of a flow of code not being a separate routine or function. Reference to function blocks is made for ease of explanation of the manner of operation of a control system according to an embodiment of the present invention.

Figure 1:
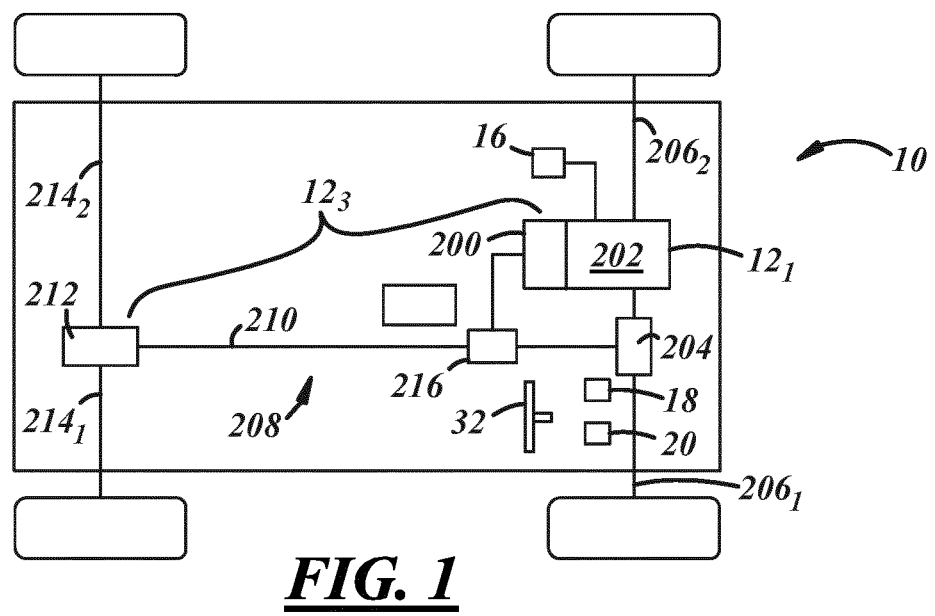
FIG. 1 is a schematic and block diagram of a vehicle.
Figure 2:
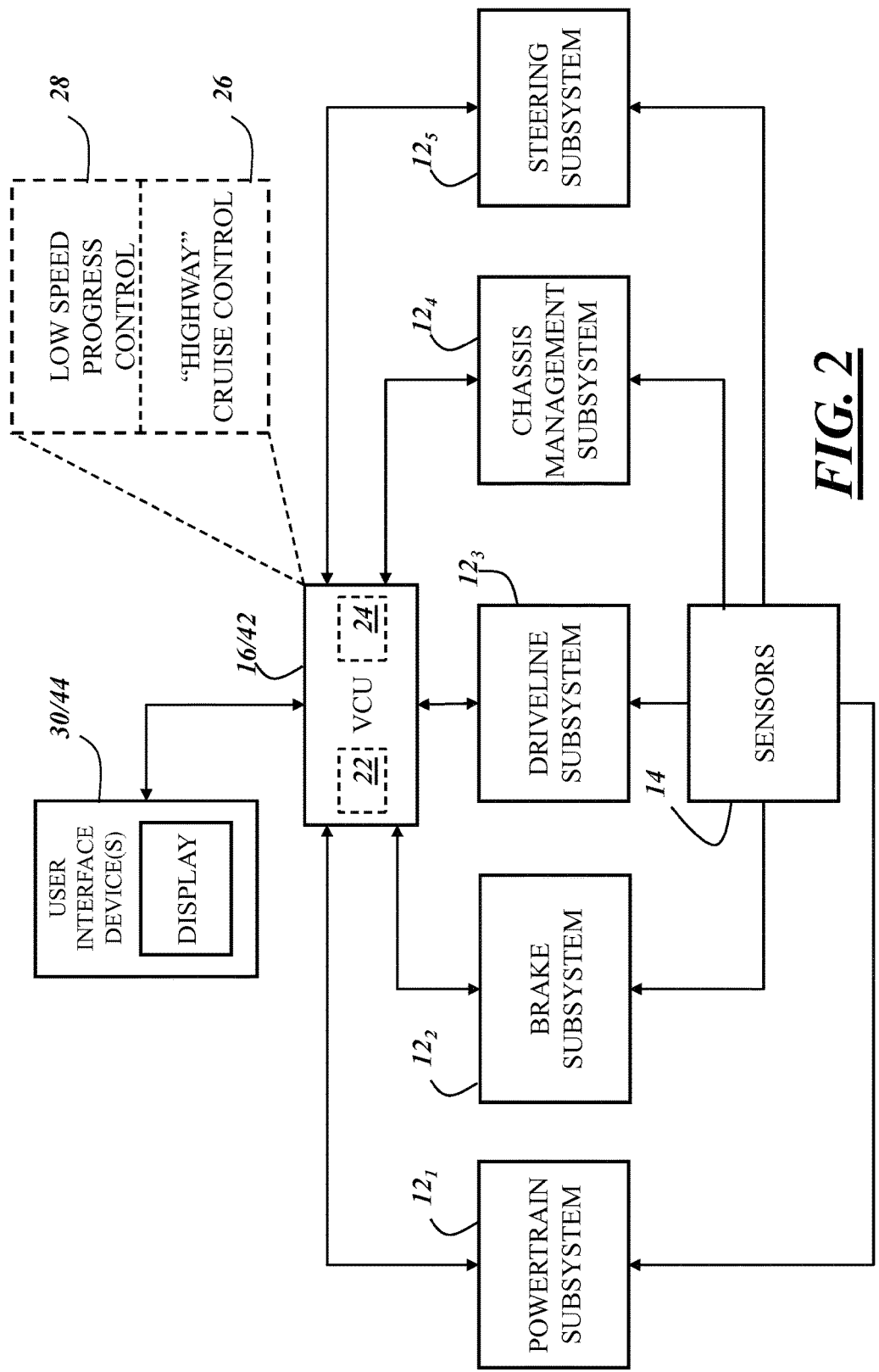
FIG. 2 is another block diagram of system interaction of the vehicle illustrated in FIG. 1.

With reference to FIGS. 1 and 2, there are shown some of the components of a vehicle 10 with which the present system and method may be used. Although the following description is provided in the context of the particular vehicle illustrated in FIGS. 1 and 2, it will be appreciated that this vehicle is merely an example and that other vehicles may certainly be used instead. For instance, in various embodiments, the method and system described herein may be used with any type of vehicle having an automatic, manual, or continuously variable transmission, including traditional vehicles, hybrid electric vehicles (HEVs), extended-range electric vehicles (EREVs), battery electrical vehicles (BEVs), passenger cars, sports utility vehicles (SUVs), cross-over vehicles, and trucks, to cite a few possibilities. According to an embodiment, vehicle 10 generally includes a plurality of vehicle systems or subsystems 12, a plurality of vehicle sensors 14, and a vehicle control means in the form of an electronic controller 16 (which, in a non-limiting embodiment such as that described below, comprises a vehicle control unit (VCU) (i.e., VCU 16)), among any number of other components, systems, and/or devices that may or may not be illustrated or otherwise described herein.

Subsystems 12 of vehicle 10 may be configured to perform or control various functions and operations relating to the vehicle and, as illustrated in FIG. 2, may include any number of subsystems, for example, a powertrain subsystem 12$_1$, a brake subsystem 12$_2$, and a driveline subsystem 12$_3$.

As is well known in the art, powertrain subsystem 12$_1$ is configured to generate power or torque (also referred to below as "drive torque") that is used to propel the vehicle. The amount of torque generated by the powertrain subsystem may be adjusted so as to control the speed of the vehicle (e.g., to increase the speed of vehicle 10, the torque output is increased). The amount of torque that a powertrain subsystem is capable of outputting is dependent upon the particular type or design of the subsystem, as different powertrain subsystems have different maximum output torque capacities. In an embodiment, however, the maximum output capacity of powertrain subsystem 12$_1$ of vehicle 10 may be in the order of 600 Nm. As is known in the art, powertrain output torque may be measured using one or more of vehicle sensors 14 described below (e.g., an engine torque sensor, a driveline torque sensor, etc.) or other suitable sensing means, and may be used for a variety of purposes by one or more components, modules, or subsystems of vehicle 10 in addition to powertrain subsystem 12$_1$, including, for example and without limitation, one or more of those described below. Those having ordinary skill in the art will appreciate that powertrain subsystem $12_1$ may be provided according to any number of different embodiments, may be connected in any number of different configurations, and may include any number of different components, such as, for example, output torque sensors, electronic control units, and/or any other suitable components known in the art. For instance, in an embodiment, powertrain subsystem $12_1$ may include one or more electric machines, for example, one or more electric machines operable as electrical generators, that are configured to apply retarding torque and/or drive torque to a portion of the powertrain subsystem and/or one or more wheels of the vehicle so as to cause the vehicle to decelerate with or without the use of the brake subsystem (e.g., frictional braking) or to propel the vehicle, respectively. Accordingly, the present invention is not limited to any one particular powertrain subsystem.

Brake subsystem $12_2$ is configured to generate brake torque (also referred to as "negative torque") that is used to slow the vehicle. The application of a sufficient amount of brake torque to the wheel(s) of vehicle 10 results in the slowing down and/or stopping of the progress of vehicle 10. Brake subsystem $12_2$ may take any number of forms known in the art, including, but certainly not limited to, one or a combination of electro-hydraulic, electro-mechanical, regenerative, and brake-by-wire systems.

In an embodiment, brake subsystem $12_2$ is a hydraulic-based brake system. As will be appreciated by one having ordinary skill in the art, the brake subsystem $12_2$ may include a brake pedal (pedal 18 shown in FIG. 1), an actuating rod, a master cylinder assembly, one or more brake or hydraulic lines, and one or more brake caliper assemblies (e.g., one for each wheel of vehicle 10), which, in turn, may include, for example, one or more caliper pistons, brake pads, and a brake disc (also called a rotor) that is coupled to an axle of vehicle 10. The operation of such a system is well known; however, for purposes of illustration, a brief summary will be provided. When pedal 18 is pressed to initiate a braking event, the actuating rod, which is coupled to pedal 18, applies a force onto a piston in the master cylinder that, in turn, causes fluid from a brake fluid reservoir to flow into the master cylinder. This results in an increase in fluid pressure in the brake system (i.e., also referred to as "brake pressure") and results in brake or hydraulic fluid being forced through the hydraulic lines toward one or more of the caliper assemblies. When the fluid reaches a caliper assembly, the piston(s) thereof apply a force to the brake pad and pushes the pad against the brake disc. Friction between the pad and the brake disc results in the generation of a brake torque that is applied to the axle to which the brake disc is coupled, thereby causing the vehicle to decelerate. In any event, it will be appreciated that while a description of one particular example of a brake subsystem has been provided, the present invention is not intended to be limited to any one particular type of brake subsystem.

As will be described in greater detail below, in an embodiment, though certainly not the only embodiment, brake subsystem $12_2$ may further include a controller or electronic control unit (ECU) that is configured and operable to perform, or to contribute to the performance of, various functions. For example, in an embodiment, brake subsystem $12_2$ may include a dedicated brake controller (commonly referred to as an anti-lock brake system (ABS) controller) that is able to individually and separately control the brake torque applied to each wheel of vehicle 10. More particularly, and as is known in the art, the brake controller may be configured, for example, to control the operation of one or more electrically-actuated valves or actuators to, in turn, control the amount of brake torque (or pressure) that is applied to one or more wheels of the vehicle. Depending on the implementation, the brake controller may also be operable to perform or control the performance of one or more of the steps of the methodology described below. Alternatively, some or all of this functionality may be performed by one or more other components of vehicle 10 in conjunction with brake subsystem $12_2$.

As illustrated in FIG. 1, driveline subsystem $12_3$ may include a multi-ratio transmission or gearbox 200 that is mechanically coupled with an output shaft of a propulsion mechanism of powertrain subsystem $12_1$ (e.g., an engine or electric motor of powertrain subsystem $12_1$, which is identified as reference number 202 in FIG. 1). Transmission 200 is arranged to drive the front wheels of vehicle 10 by means of a front differential 204 and a pair of front drive shafts $206_1$, $206_2$. In the illustrated embodiment, driveline subsystem $12_3$ also comprises an auxiliary driveline portion 208 arranged to drive the rear wheels of vehicle 10 by means of an auxiliary driveshaft or prop-shaft 210, a rear differential 212, and a pair of rear drive shafts $214_1$, $214_2$. In various embodiments, driveline subsystem $12_3$ may be arranged to drive only the front wheels or the rear wheels, or selectable two wheel drive/four wheel drive vehicles. In an embodiment such as that illustrated in FIG. 1, transmission 200 is releasably connectable to the auxiliary driveline portion 208 by means of a transfer case or power transfer unit 216, allowing selectable two wheel drive or four wheel drive operation. In certain instances, and as is well known in the art, transfer unit 216 may be configured to operate in either a high range (HI) or low range (LO) gear ratio, which may be adjustable by driveline subsystem $12_3$ itself and/or by another component of vehicle 10, such as, for example, VCU 16. Those having ordinary skill in the art will appreciate that driveline subsystem $12_3$ may be provided according to any number of different embodiments, implementations, or configurations, may be connected in any number of different configurations, and may include any number of different components, like sensors (e.g., HI/LO ratio sensor, transmission gear ratio sensors, etc.), control units, and/or any other suitable components known in the art. Accordingly, the present invention is not intended to be limited to any one particular driveline subsystem.

In addition to those subsystems described above, vehicle 10 may further comprise any number of other or additional subsystems. For example, and as illustrated in FIG. 2, vehicle 10 may include a chassis management or control subsystem $12_4$ and/or a steering subsystem $12_5$, to cite a few possibilities. For the purposes of this invention, each of the aforementioned subsystems 12 and the functionality corresponding thereto is conventional in the art. As such, detailed descriptions will not be provided; rather, the structure and function of each identified subsystem 12 will be readily apparent to those having ordinary skill in the art.

In an embodiment, one or more of subsystems 12 may be under at least a certain degree of control by VCU 16 (a detailed description of which will be provided below). In such an embodiment, those subsystems 12 are electrically coupled to, and configured for communication with, VCU 16 to provide feedback to VCU 16 relating to operational or operating parameters of the vehicle, as well as to receive instructions or commands from VCU 16. Taking powertrain subsystem $12_1$ as an example, powertrain subsystem $12_1$ may be configured to gather various types of information relating to certain vehicle operating parameters, such as, for example, torque output, engine or motor speed, etc., and to communicate that information to VCU 16. This information may be gathered from, for example, one or more of vehicle sensors 14 described below. Powertrain subsystem 12₁ may also receive commands from VCU 16 to adjust certain operating parameters when, for example, a change in conditions dictates such a change (e.g., when a change in vehicle speed has been requested via a brake pedal (pedal 18 in FIG. 1) or an accelerator pedal (pedal 20 in FIG. 1) of vehicle 10). While the description above has been with particular reference to powertrain subsystem 12₁, it will be appreciated that the same principle applies to each such other subsystem 12 that is configured to exchange information/commands with VCU 16 or directly with one another.

In an embodiment, each subsystem 12 may include a dedicated control means in the form of one or more controllers (e.g., one or more electronic control units (ECUs)) configured to receive and execute instructions or commands provided by VCU 16, and/or to perform or control certain functionality independent from VCU 16. In such an embodiment, each controller may comprise any suitable ECU, and may include any variety of electronic processing devices, memory devices, input/output (I/O) devices, and/or other known components, and perform various control and/or communication related functions. In an embodiment, each controller may include an electronic memory device that may store various information, sensor readings (e.g., such as those generated by vehicle sensors 14), look-up tables, profiles, or other data structures (e.g., such as those used in the performance of the method described below), algorithms (e.g., the algorithms embodied in the method described below), etc. The memory device may comprise a carrier medium carrying a computer-readable code for controlling one or more components of vehicle 10 to carry out the method(s) described below. Each controller may also include one or more electronic processing devices (e.g., a microprocessor, a microcontroller, an application specific integrated circuit (ASIC), etc.) that executes instructions for software, firmware, programs, algorithms, scripts, applications, etc. that are stored in the corresponding memory device and may govern the methods described herein. Each controller may also be electronically connected to other vehicle devices, modules, subsystems, and components (e.g., sensors) via suitable vehicle communications and can interact with them when or as required.

Alternatively, two or more subsystems 12 may share a single controller, or one or more subsystems 12 may be directly controlled by the VCU 16 itself. In an embodiment wherein a subsystem 12 communicates with VCU 16 and/or other subsystems 12, such communication may be facilitated via any suitable wired or wireless connection, such as, for example, a controller area network (CAN) bus, a system management bus (SMBus), a proprietary communication link, or through some other arrangement known in the art.

For purposes of this disclosure, and notwithstanding the above, it is to be understood that the controller(s) or ECU(s) described herein may each comprise a control unit or computational device having one or more electronic processors. Vehicle 10 and/or a subsystem 12 thereof may comprise a single control unit or electronic controller or alternatively different functions of the controller(s) may be embodied in, or hosted in, different control units or controllers. As used herein, the term "control unit" will be understood to include both a single control unit or controller and a plurality of control units or controllers collectively operating to provide the required control functionality. A set of instructions could be provided which, when executed, cause said controller(s) or control unit(s) to implement the control techniques described herein (including the method(s) described below). The set of instructions may be embedded in one or more electronic processors, or alternatively, may be provided as software to be executed by one or more electronic processor(s). For example, a first controller may be implemented in software run on one or more electronic processors, and one or more other controllers may also be implemented in software run on or more electronic processors, optionally the same one or more processors as the first controller. It will be appreciated, however, that other arrangements are also useful, and therefore, the present invention is not intended to be limited to any particular arrangement. In any event, the set of instructions described above may be embedded in a computer-readable storage medium (e.g., a non-transitory storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM ad EEPROM); flash memory; or electrical or other types of medium for storing such information/instructions.

It will be appreciated that the foregoing represents only some of the possibilities with respect to the particular subsystems of vehicle 10 that may be included, as well as the arrangement of those subsystems with VCU 16. Accordingly, it will be further appreciated that embodiments of vehicle 10 including other or additional subsystems and subsystem/VCU arrangements remain within the spirit and scope of the present invention.

Vehicle sensors 14 may comprise any number of different sensors, components, devices, modules, systems, etc. In an embodiment, some or all of sensors 14 may provide subsystems 12 and/or VCU 16 with information or input that can be used by the present method, and as such, may be electrically coupled (e.g., via wire(s) or wirelessly) to, and configured for communication with, VCU 16, one or more subsystems 12, or some other suitable device of vehicle 10. Sensors 14 may be configured to monitor, sense, detect, measure, or otherwise determine a variety of parameters relating to vehicle 10 and the operation and configuration thereof (also referred to as "vehicle-related parameters"), and may include, for example and without limitation, any one or more of: wheel speed sensor(s); ambient temperature sensor(s); atmospheric pressure sensor(s); tire pressure sensor(s); gyro sensor(s) to detect yaw, roll, and pitch of the vehicle; vehicle speed sensor(s); longitudinal acceleration sensor(s); engine torque sensor(s); driveline torque sensor(s); throttle valve sensor(s); steering angle sensor(s); steering wheel speed sensor(s); gradient sensor(s); lateral acceleration sensor(s); brake pedal position sensor(s); brake pedal pressure sensor(s); brake pressure sensor(s); accelerator pedal position sensor(s); air suspension sensor(s) (i.e., ride height sensors); wheel position sensor(s); wheel articulation sensor(s); vehicle body vibration sensor(s); water detection sensor(s) (for both proximity and depth of wading events); transfer case HI-LO ratio sensor(s); air intake path sensor(s); vehicle occupancy sensor(s); and longitudinal, lateral, and vertical motion sensor(s), among others known in the art.

The sensors identified above, as well as any other sensors not specifically identified above but that may provide information that can be used by the present method, may be embodied in hardware, software, firmware, or some combination thereof. Sensors 14 may directly sense or measure the conditions for which they are provided, or they may indirectly evaluate such conditions based on information provided by other sensors, components, devices, modules, systems, etc. Further, these sensors may be directly coupled to VCU 16 and/or to one or more of vehicle subsystems 12, indirectly coupled thereto via other electronic devices, vehicle communications bus, network, etc., or coupled in accordance with some other arrangement known in the art. Some or all of these sensors may be integrated within one or more of the vehicle subsystems 12 identified above, may be standalone components, or may be provided in accordance with some other arrangement. Finally, it is possible for any of the various sensor readings used in the present method to be provided by some other component, module, device, subsystem, etc. of vehicle 10 instead of being directly provided by an actual sensor element. For example, VCU 16 or a subsystem 12 may receive certain information from the ECU of a (another) subsystem 12 rather than directly from a sensor 14. It should be appreciated that the foregoing scenarios represent only some of the possibilities, as vehicle 10 is not limited to any particular sensor(s) or sensor arrangement(s); rather any suitable embodiment may be used.

In an embodiment, VCU 16 may comprise any suitable ECU, and may include any variety of electronic processing devices, memory devices, input/output (I/O) devices, and/or other known components, and perform various control and/or communication related functions. In an embodiment, VCU 16 includes an electronic memory device 22 that may store various information, sensor readings (e.g., such as those generated by vehicle sensors 14), look-up tables or other data structures (e.g., such as those used in the performance of the method described below), algorithms (e.g., the algorithms embodied in the method described below), etc. Memory device 22 may comprise a carrier medium carrying a computer-readable code for controlling one or more components of vehicle 10 to carry out the method(s) described below. Memory device 22 may also store pertinent characteristics and background information pertaining to vehicle 10 and subsystems 12. VCU 16 may also include one or more electronic processing devices 24 (e.g., a microprocessor, a microcontroller, an application specific integrated circuit (ASIC), etc.) that executes instructions for software, firmware, programs, algorithms, scripts, applications, etc. that are stored in memory device 22 and may govern the methods described herein. As described above, VCU 16 may be electronically connected to other vehicle devices, modules, subsystems, and components (e.g., sensors) via suitable vehicle communications and can interact with them when or as required. In addition to the functionality that may be performed by VCU 16 described elsewhere herein, in an embodiment, VCU 16 may also be responsible for various functionality described above with respect to subsystems 12, especially when those subsystems are not also configured to do so. These are, of course, only some of the possible arrangements, functions, and capabilities of VCU 16, as other embodiments, implementations, or configurations could also be used. Depending on the particular embodiment, VCU 16 may be a stand-alone vehicle electronic module, may be incorporated or included within another vehicle electronic module (e.g., in one or more of the subsystems 12 identified above), or may be otherwise arranged and configured in a manner known in the art. Accordingly, VCU 16 is not limited to any one particular embodiment or arrangement.

In addition to the components and systems described above, in an embodiment, vehicle 10 may further comprise one or more automatic vehicle speed control systems. For example and with continued reference to FIG. 2, in an embodiment, vehicle 10 may further comprise a cruise control system 26, also referred to as an "on-highway" or "on-road" cruise control system, and a low-speed progress (LSP) control system 28, which may be referred to an "off-highway" or "off-road" progress control system.

On-highway cruise control system 26, which may comprise any number of conventional cruise control systems known in the art, is operable to automatically maintain vehicle speed at a desired "set-speed" set by the user. Such systems are generally limited in their use in that the vehicle must be traveling above a certain minimum threshold speed (e.g., 30 mph (approximately 50 kph)) for the system to be operable. As such, these systems are particularly suited for use in highway driving, or at least driving wherein there is not a lot of repeated starting and stopping, and that permits the vehicle to travel at a relatively high speed. As is known in the art, on-highway cruise control system 26 may include a dedicated or standalone ECU configured to execute and perform the functionality of the system, or alternatively, the functionality of cruise control system 26 may be integrated into another subsystem 12 of vehicle 10 (e.g., powertrain subsystem $12_1$), or for example, VCU 16 (as is illustrated in FIG. 2).

Figure 3:
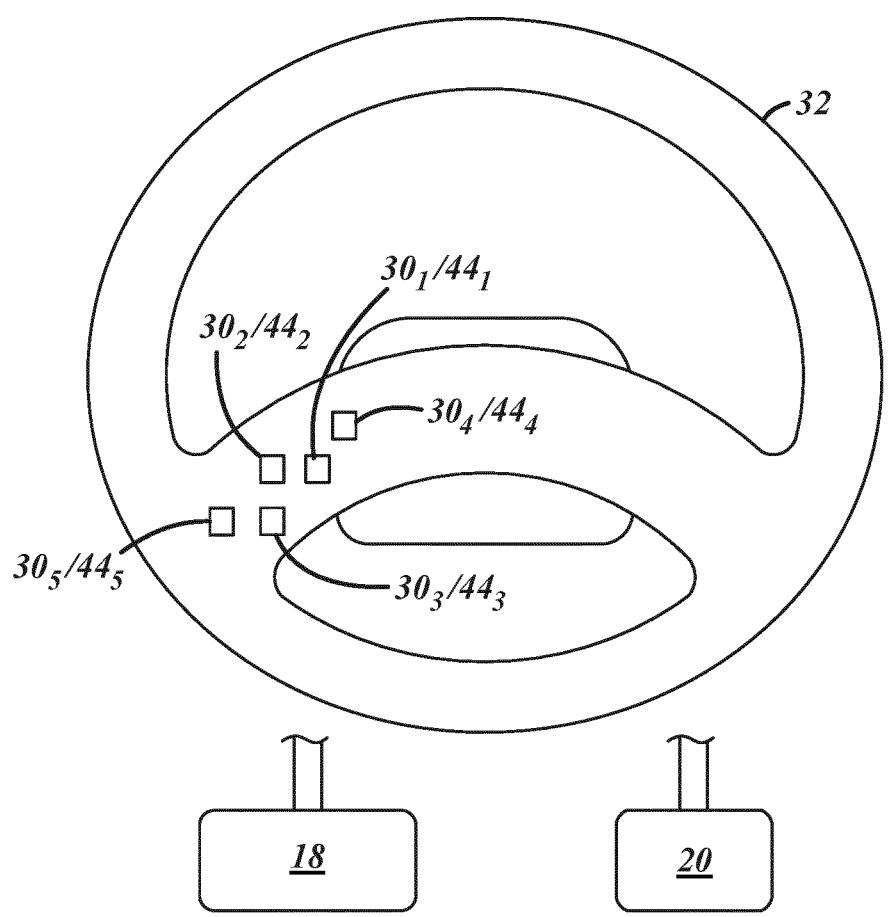
FIG. 3 is a diagram of a steering wheel for use with a vehicle, such as the vehicle illustrated in FIGS. 1 and 2.

Further, and as is known in the art, cruise control system 26 may include one or more user interface devices 30 that may be used by the user (e.g., driver) to interact with system 26 (e.g., the ECU thereof), and in certain embodiments, that allow the system to interact with the user. For example, these devices may allow a user to activate/deactivate system 26 and set and/or adjust the set-speed of the system, to cite a few possibilities. Each of these devices may take any number of forms, such as, for example and without limitation, one or more of: a pushbutton; a switch; a touch screen; a visual display; a speaker; a heads-up display; a keypad; a keyboard; or any other suitable device. Additionally, these devices may be located at any number of locations within the vehicle cabin and in relatively close proximity to the user (e.g., steering wheel, steering column, dashboard, center console, etc.). For instance, and with reference FIG. 3, the steering wheel of vehicle 10 (i.e., steering wheel 32 in FIG. 1) may be configured with a plurality user interface devices of cruise control system 26 in the form of pushbuttons. One such device may be a "set speed" button $30_1$ that when manipulated in a particular manner may activate the operation of cruise control system 26 and also set the desired set-speed. Cruise control system 26 may further comprise one or more other user-selectable interface devices (e.g., buttons) to allow the user to increase or decrease the set-speed of the system. For example, a "+" button $30_2$ may be provided to allow the user to increase the set-speed in discrete increments (e.g., 1 mph (or 1 kph)), and a "−" button $30_3$ to allow the user to decrease the set-speed in the same or different discrete increments. Alternatively, the "+" and "−" buttons $30_2$, $30_3$ may be integrated into a single user-selectable device. Additional user-selectable interface devices of system 26 may include, for example, a "cancel" button $30_4$ to deactivate the system, as well as a "resume" button $30_5$ to allow for the system to be re-activated following a temporary suspension of the system function, for example standard cruise control system go into a standby state where they do not control vehicle speed if the user brakes as detailed further below.

It should be appreciated that the foregoing scenarios represent only some of the possibilities of cruise control system 26 and the user interface devices thereof, as vehicle 10 is not limited to any particular cruise control system or user interface device or arrangement; rather, any suitable embodiments may be used.

LSP control system 28 provides a speed control system that enables, for example, the user of a vehicle equipped with such a system to select a very low target speed or set-speed at which the vehicle can progress without, for example, any pedal inputs being required by the user. This low-speed progress control function differs from that of cruise control system 26 in that unlike cruise control system 26, the vehicle need not be traveling at relatively high speeds (e.g., 30 mph (approximately 50 kph)) for the system to be operable (although system 28 may be configured to facilitate automated speed control at speeds from rest to around 30 mph (approximately 50 kph) or more, and therefore, is not limited to "low speed" operation). Furthermore, known on-highway cruise control systems are configured so that in the event the user presses or depresses the brake or the clutch pedals, for example, the on-road cruise control function is suspended and the vehicle reverts to a manual mode of operation requiring user pedal input to maintain vehicle speed and a dedicated operator input (e.g., a "resume" button) is needed to reactivate the cruise control in an active mode in which it controls vehicle speed. In addition, in at least certain cruise control systems, the detection of a wheel slip event, which may be initiated by a loss of traction, may also have the effect of cancelling the cruise control function. LSP control system 28 may also differ from such cruise control systems in that, in at least an embodiment, it is configured in such a way that the speed control function provided thereby may not be cancelled or deactivated in response to those events described above. In an embodiment, LSP control system 28 is particularly suited for use in off-road or off-highway driving.

In an embodiment, LSP control system 28 includes, among potentially other components, a control means in the form of a controller 42, which, in an embodiment such as that described below, comprises an ECU (i.e., ECU 42) (shown, in the illustrated embodiment and for reasons described below, as comprising VCU 16), and one or more user input devices 44. ECU 42 may include any variety of electronic processing devices, memory or storage devices, input/output (I/O) devices, and any other known components, and may perform any number of functions of LSP control system 28, including those described below and embodied in the present method. To that end, ECU 42 may be configured to receive information from a variety of sources (e.g., vehicle sensors 14, vehicle subsystems 12, user input devices 44) and to evaluate, analyze, and/or process that information in an effort to control or monitor one or more operational aspects of vehicle 10, such as, for example: detecting brake and brake release commands initiated by a user or vehicle occupant; automatically commanding and controlling a drive torque generated by the powertrain subsystem $12_1$ and/or a retarding torque generated and applied to one or more wheels of vehicle 10 by, for example, brake subsystem $12_2$; determining the type and/or one or more characteristics of the terrain over which vehicle 10 is traveling; etc. Further, in an embodiment, ECU 42 is configured to carry out or perform one or more steps of the present method described in greater detail below. It should be appreciated that ECU 42 may be a standalone electronic module or may be integrated or incorporated into either another subsystem 12 of vehicle 10 or, for example, VCU 16. For purposes of illustration and clarity, the description below will be with respect to an embodiment wherein the functionality of ECU 42 is integrated or incorporated into VCU 16, such that, as illustrated in FIG. 2, VCU 16 comprises the ECU of LSP control system 28. Accordingly, in such an embodiment, VCU 16, and a memory device thereof or accessible thereby (e.g., memory device 22), in particular, stores various information, data (e.g., predefined set-speeds), sensor readings, look-up tables or other data structures, algorithms, software, acceleration/deceleration profile(s), and the like, required for performing the functionality of LSP control system 28, including that embodied in the method described below.

As with on-highway cruise control system 26 described above, LSP control system 28 further comprises one or more user interface devices 44 that may be used by a user to interact with the system 28, and in certain embodiments, to allow the system 28 to interact with the user. These devices may allow the user to, for example, activate/deactivate LSP control system 28, set and/or adjust the set-speed of the system, select a desired set-speed from a plurality of predefined set-speeds, switch between two or more predefined set-speeds, identify the particular type of terrain vehicle 10 is traversing, and otherwise interact with system 28 as may be described below. These user interface devices may also allow for system 28 to provide certain notifications, alerts, messages, requests, etc. to the user including, but not limited to, those described herein below. Each of these devices may take any number of forms, such as, for example and without limitation, one or more of: a pushbutton; a switch; a touch screen; a visual display; a speaker; a heads-up display; a keypad; a keyboard; a selector knob or dial; or any other suitable device. Additionally, these devices may be located at any number of locations within the vehicle cabin and in relatively close proximity to the user (e.g., steering wheel, steering column, dashboard, etc.). In an embodiment, user interface devices 30, 44 of on-highway cruise control system 26 and LSP control system 28, respectively, are arranged adjacent to one another within vehicle 10, and, in an embodiment, on steering wheel 32 of vehicle 10. However, in other embodiments, such as, for example, that described herein, on-highway cruise control system 26 and LSP control system 28 may share some or all of the same user interface devices. In such an embodiment, an additional user-selectable device, such as a switch, pushbutton, or any other suitable device may be provided to switch between the two speed control systems. Accordingly, in the embodiment illustrated in FIG. 3, those user interface devices $30_1$-$30_5$ described above with respect to cruise control system 26 may also be used in the operation of LSP control system 28, and as such, may also be referred to as user interface devices $44_1$-$44_5$ when discussed in the context of system 28.

In addition to performing a speed control function, LSP control system 28 may be further configured to detect, sense, derive, or otherwise determine information relating to the terrain over which vehicle 10 is traveling (e.g., terrain type, surface type, terrain classification, terrain or surface roughness, etc.). In accordance with an embodiment, VCU 16 may be configured to perform this function and to do so in a number of ways. One such way is that described in UK Published Application No. GB2492748A published on 16 Jan. 2013, the entire contents of which are incorporated herein by reference. More particularly, in an embodiment, information relating to a variety of different parameters associated with the vehicle are received or acquired from a plurality of vehicle sensors and/or various vehicle subsystems, including, for example, some or all of those sensors 14 and/or subsystems 12 described above. The received information is then evaluated and used to determine one or more terrain indicators, which may represent the type of terrain and, in certain instances, one or more characteristics thereof, such as, for example, the classification, roughness, etc. of the terrain.

More specifically, in an embodiment, the speed control system (e.g., VCU 16) may include an evaluation means in the form of an estimator module to which the information acquired or received from one or more sensors 14 and/or subsystems 12 (collectively referred to as "sensor/subsystem outputs" below) is provided. Within a first stage of the estimator module, various ones of the sensor/subsystem outputs are used to derive a number of terrain indicators. In the first stage, vehicle speed is derived from wheel speed sensors, wheel acceleration is derived from wheel speed sensors, the longitudinal force on the wheels is derived from a vehicle longitudinal acceleration sensor, and the torque at which wheel slip occurs (if wheel slip occurs) is derived from a powertrain torque signal provided by the powertrain subsystem and additionally or alternatively from a torque signal provided by the driveline subsystem (e.g., transmission), and from motion sensors to detect yaw, pitch and roll. Other calculations performed within the first stage of the estimator module include the wheel inertia torque (the torque associated with accelerating or decelerating the rotating wheels), "continuity of progress" (the assessment of whether the vehicle is repeatedly starting and stopping, for example as may be the case when the vehicle is traveling over rocky terrain), aerodynamic drag, and lateral vehicle acceleration.

The estimator module also includes a second stage in which the following terrain indicators are calculated: surface rolling resistance (based on the wheel inertia torque, the longitudinal force on the vehicle, aerodynamic drag, and the longitudinal force on the wheels), the steering force on the steering wheel (based on the lateral acceleration and the output from a steering wheel sensor and/or steering column sensor), the wheel longitudinal slip (based on the longitudinal force on the wheels, the wheel acceleration, stability control system (SCS) activity and a signal indicative of whether wheel slip has occurred), lateral friction (calculated from the measured lateral acceleration and the yaw versus the predicted lateral acceleration and yaw), and corrugation detection (high frequency, low amplitude vertical wheel excitement indicative of a washboard type surface). The SCS activity signal is derived from several outputs from the ECU of a stability control system (SCS), which may contain a dynamic stability control (DSC) function, a terrain control (TC) function, anti-lock braking system (ABS), and hill descent control (HDC) algorithms, indicating DSC activity, TC activity, ABS activity, brake interventions on individual wheels, and powertrain torque reduction requests from the SCS ECU to the powertrain subsystem. All these indicate a slip event has occurred and the SCS ECU has taken action to control it. The estimator module also uses the outputs from wheel speed sensors and in a four wheel vehicle, compares outputs across each axle and from front to rear on each side, to determine a wheel speed variation and corrugation detection signal.

In an embodiment, and in addition to the estimator module, a road roughness module may also be included for calculating the terrain roughness based on air suspension sensors (the ride height or suspension articulation sensors) and wheel accelerometers. In such an embodiment, a terrain indicator signal in the form of a roughness output signal is output from the road roughness module.

In any event, the estimates for the wheel longitudinal slip and the lateral friction estimation are compared with one another within the estimator module as a plausibility check. Calculations for wheel speed variation and corrugation output, the surface rolling resistance estimation, the wheel longitudinal slip and the corrugation detection, together with the friction plausibility check, are then output from the estimator module and provide terrain indicator output signals, indicative of the nature of the terrain over which the vehicle is traveling, for further processing by VCU 16. For example, the terrain indicators may be used to determine which of a plurality of vehicle subsystem control modes (e.g., terrain modes) is most appropriate based on the indicators of the type of terrain over which the vehicle is traveling, and to then automatically control the appropriate subsystems 12 accordingly.

In another embodiment, rather than LSP control system 28 performing the above-described terrain sensing/detecting functionality, another component, module, or subsystem of vehicle 10, such as, for example VCU 16 (in the case where it does not perform the functionality of LSP control system 28), one of subsystems 12, or another suitable component may be appropriately configured to do so, and such other embodiments remain within the spirit and scope of the present invention.

It should be appreciated that the foregoing description of the arrangement, functionality, and capability of LSP control system 28 has been provided for purposes of example and illustration only and is not meant to be limiting in nature. Accordingly, LSP control system 28 is not intended to be limited to any particular embodiments or arrangements.

Again, the preceding description of vehicle 10 and the illustrations in FIGS. 1 and 2 are only intended to illustrate one potential vehicle arrangement and to do so in a general way. Any number of other vehicle arrangements and architectures, including those that differ significantly from the one shown in FIGS. 1 and 2, may be used instead.

Turning now to FIGS. 4A-4D, there are shown examples of a method 100 of controlling the operation of a vehicle brake system. For purposes of illustration and clarity, method 100 will be described in the context of vehicle 10 described above and illustrated in FIGS. 1 and 2, and brake subsystem 12$_2$ thereof in particular. It will be appreciated however, that the application of the present methodology is not meant to be limited solely to such an arrangement, but rather method 100 may find application with any number of arrangements (i.e., the steps of method 100 may be performed by subsystems or components of vehicle 10 other than that or those described below, or vehicle arrangements (e.g., brake systems) other than that or those described above). Additionally, it will be appreciated that unless otherwise noted, the performance of method 100 is not meant to be limited to any one particular order or sequence of steps or to any particular component(s) for performing the steps.

In an embodiment, method 100 comprises a step 102 of receiving one or more electrical signals each of which is indicative of a value of a respective vehicle-related parameter that can be used to determine or detect if vehicle 10 is traveling across a slope or gradient as illustrated, for example, in FIG. 5. In one non-limiting example, step 102 comprises receiving an electrical signal that is indicative of, or that may be used to derive, a value of the roll or roll rate of vehicle 10, although it will be appreciated that signals indicative of values of one or more other vehicle-related parameters may additionally or alternatively be received and used for the purposes described herein. The signal(s) received in step 102 may be received from an appropriately configured sensor 14 of vehicle 10 (e.g., a gyro sensor configured to measure or detect the roll of vehicle 10, a gradient sensor, lateral acceleration sensor, etc.) or from another component of vehicle 10, for example, a subsystem 12 (e.g., chassis management and control subsystem 12₄, etc.). The signal(s) may be received directly from the corresponding sensor(s) and/or subsystem(s), or indirectly via, for example, a CAN bus, a SMBus, a proprietary communication link, or in another suitable manner. Accordingly, it will be appreciated in view of the foregoing that the present invention is not intended to be limited to any one particular vehicle-related parameter(s) or technique(s) or source(s) from which the parameter value(s) is/are received in step 102. In an embodiment, step 102 may further include processing and/or interpreting the received signal(s) to determine the value(s) of the parameter(s) represented by the signal(s) (or that the signal(s) is/are indicative of). Alternatively, this may be performed in another step, for example, step 104 described below.

The functionality of step 102 may be performed by any suitable means, for example, an electronic processor that includes an electrical input for receiving electrical signals, including, for example, those described above. In an embodiment, the electronic processor may comprise and electronic processor of brake subsystem 12₂ (e.g., ABS controller) or another suitable component of vehicle 10.

Following the receipt of the signal(s) in step 102, method 100 may move to a step 104 of detecting or determining whether vehicle 10 is traveling across a side slope or gradient based on the value(s) represented by the signal(s) received in step 102. Step 104 may be performed in a number of ways. For example, in one embodiment or implementation step 104 comprises comparing each of the values of the vehicle-related parameter(s), or one or more values derived from the value(s) represented by the received signal(s), to a corresponding predefined threshold. Depending on whether the value(s) is/are above or below the corresponding predefined threshold(s), a determination can be made as to whether vehicle 10 is traveling across a slope. For example, in the scenario described above wherein the signal received in step 102 is indicative of a value of the roll or roll rate of vehicle 10, step 104 may comprise comparing that value to a roll or roll rate threshold and if the value is above (or, in an embodiment, meets or is above) the threshold, a determination can be made that vehicle 10 is traveling across a slope; while if the value is below (or, in an embodiment, meets or is below) the threshold, a determination can be made that the vehicle is not traveling across a slope. In an embodiment wherein values of multiple vehicle-related parameters are compared to thresholds in step 104, step 104 may comprise determining or detecting that vehicle 10 is traveling across a slope when the comparisons for all of the parameter values are indicative of vehicle 10 doing so; while in other embodiments, such a determination can be made when a certain number of comparisons less than all (e.g., a majority), or comparisons for certain predetermined parameters, are indicative of vehicle 10 doing so. In any event, in an embodiment wherein one or more values of one or more vehicle-related parameters are compared to corresponding predefined threshold value(s), the threshold value(s) may be empirically-derived and programmed into a memory device of a suitable vehicle component during manufacture of the vehicle 10 or at another time.

While one particular way for determining or detecting whether vehicle 10 is traveling across a slope has been described in detail above, it will be appreciated by those of ordinary skill in the art that other ways or techniques for doing so may additionally or alternatively be used. Accordingly, the present invention is not intended to be limited to the use of any particular way(s) or technique(s) of using value(s) of one or more vehicle-related parameters to determine or detect whether vehicle 10 is traveling across a slope.

Figure 4A:
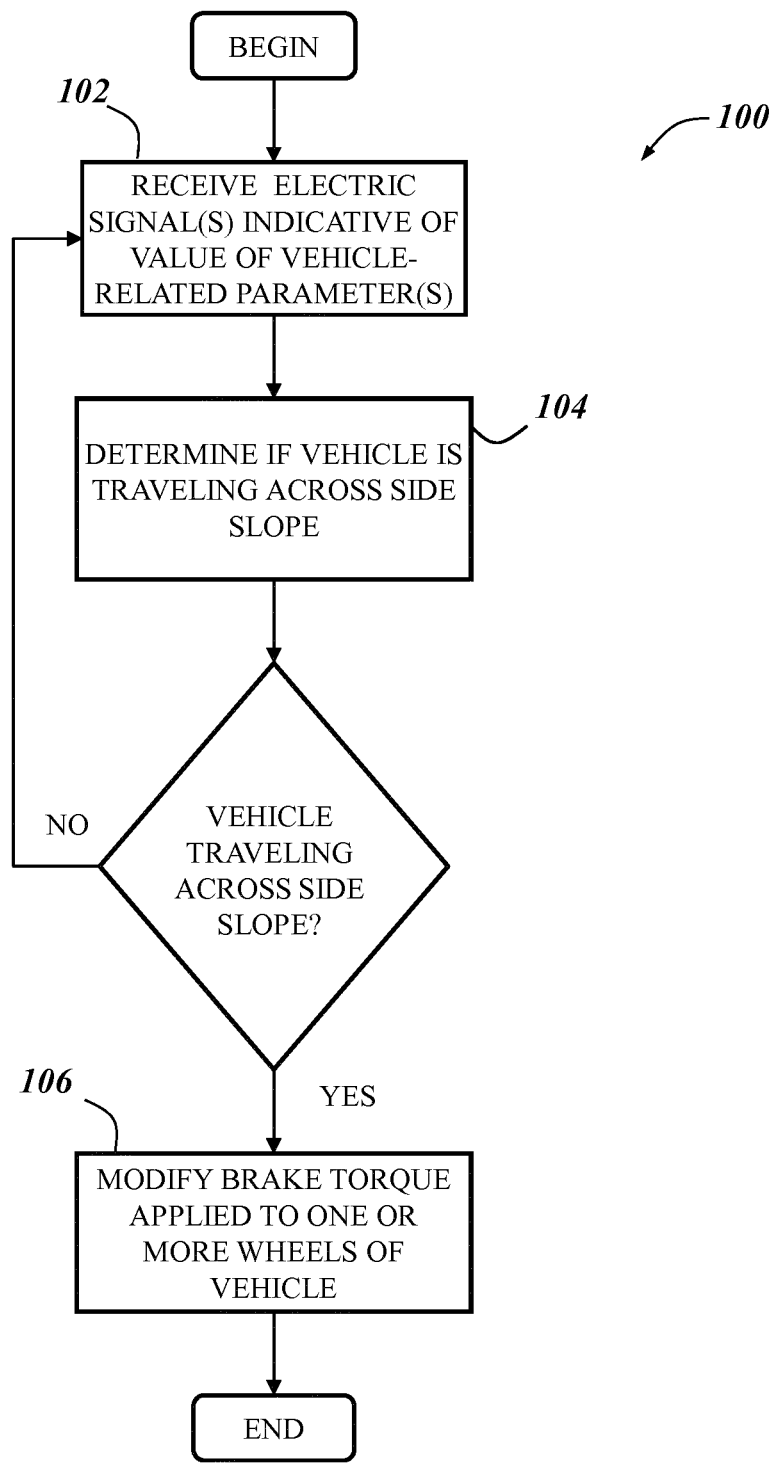
FIGS. 4A-4D are flow diagrams depicting various steps of illustrative embodiments of a method of automatically controlling the operation of a brake system of a vehicle.

If it is determined in step 104 that vehicle 10 is not traveling across a slope, method 100 may terminate or, as illustrated in FIG. 4A, loop back to step 102. Conversely, if it is determined or detected in step 104 that vehicle 10 is, in fact, traveling across a slope, method 100 may proceed to a step 106 of automatically modifying or adjusting (or commanding a modification or adjustment to) the amount of brake torque being applied to at least certain of the wheels of the vehicle. Depending on the implementation of method 100, the brake torque may be modified in one or more different ways, and the modification(s) may be made for a number of different reasons.

One way the brake torque may be modified is by increasing the amount of brake torque being applied to one or more wheels on the "uphill" side of vehicle 10 (represented by reference numeral 34 in FIG. 5) and decreasing the amount of brake torque being applied to one or more wheels on the "downhill" side of the vehicle (represented by reference numeral 36 in FIG. 5). The result of such a modification is that the brake torque is biased towards the uphill wheels of the vehicle relative to the downhill wheels (i.e., a greater amount of brake torque is applied to the one or more of the uphill wheels than is applied to one or more of the downhill wheels). Accordingly, in an instance wherein vehicle 10 includes a forward wheel and a rearward wheel on both the passenger and driver sides of the vehicle, the amount of brake torque applied to each of the forward and/or rearward uphill wheels may be increased, and the amount of brake torque applied to each of the forward and/or rearward downhill wheels may be decreased.

One reason for modifying the brake torque in this way is that as a vehicle traveling across a slope having a deformable, low-mu surface (e.g., sand) decelerates, the confluence of a number of factors (e.g., the nature of the surface, the magnitude or amount of brake torque being applied to the wheels, the vertical force being applied to the downhill wheels due the transfer of the vehicle weight to the downhill side of the vehicle, etc.) causes the downhill wheels to dig significantly further into the surface as compared to the uphill wheels. As a result, the vehicle may experience an increased roll or lean in the downhill direction, and a significant amount of surface material (e.g., sand) may build up around the downhill wheels. Decreasing or reducing the amount of brake torque being applied to one or more of the downhill wheels and increasing the amount applied to one or more of the uphill wheels has the effect of lessening the degree to which the downhill wheels dig or sink into the surface (and allows the wheels to rotate more easily or freely over the surface), and increasing the degree to which the uphill wheels dig or sink. This serves to, for example, allow the downhill wheels to sit higher on the surface, maintain the appropriate deceleration, limit the roll or lean of the vehicle by keeping the uphill wheels low in the surface rendering the vehicle more level relative to the surface (e.g., it limits the degree to which the vehicle rolls or leans in the downhill direction beyond that which would be expected, or that it would ordinarily experience, while traveling across a slope of the same or similar slope having a higher mu surface), improve steering control, and/or limit the amount of surface material that may build up around the downhill wheels by preventing the wheels from locking up and thereby making it easier to subsequently pull away in a composed manner.

In an embodiment wherein the brake torque may be modified as described above, step 106 may comprise first determining which wheels of the vehicle are the uphill wheels and which are the downhill wheels, and then modifying (or commanding the modification to) the brake torque being applied accordingly. The determination as to which wheels are the uphill wheels and which are the downhill wheels may be made in a number of ways known in the art. One way, though certainly not the only way, is by evaluating one or more vehicle-related parameters. For example, one or more electrical signals indicative of, or that may be used to derive, the roll or roll rate of the vehicle may be received from one or more vehicle sensors (e.g., a gyro sensor) and the roll or roll rate may then be used to determine the direction in which the vehicle is leaning or rolling (i.e., towards the driver or passenger side of the vehicle). Based on that determination, the further determination as to which wheels are the uphill and downhill wheels may be made. Once that determination is made, step 106 may proceed to modifying (or commanding the modification to) the brake torque being applied accordingly. Another way the brake torque may be modified in step 106 is the opposite of that described immediately above and includes decreasing the amount of brake torque being applied to one or more uphill wheels and increasing the amount of brake torque being applied to one or more downhill wheels. The result of such a modification is that the brake torque is biased towards the downhill wheels of the vehicle relative to the uphill wheels (i.e., a greater amount of brake torque is applied to one or more of the downhill wheels than is applied to one or more of the uphill wheels). Accordingly, in the instance wherein vehicle 10 includes a forward wheel and a rearward wheel on both of the passenger and driver's side, the amount of brake torque applied to each of the forward and/or rearward downhill wheels may be increased, and the amount of brake torque applied to each of the forward and/or rearward uphill wheels may be decreased.

One reason the brake torque may be modified in this way is that as a vehicle traveling across a slope having a deformable, low-mu surface decelerates, the vehicle may begin to slide (even if ever so slightly) sideways down the slope. By increasing the amount of brake torque being applied to one or more of the downhill wheels and decreasing or reducing the amount applied to one or more of the uphill wheels, the downhill wheels may dig or sink further into the surface, thereby preventing (or at least limiting) the sliding of the vehicle down the slope. Further, in certain circumstances, modifying or biasing the brake torque in this manner may also serve to decelerate the vehicle more quickly than it otherwise would. More particularly, when, for example, the vehicle is traveling in substantially a straight line across the slope and a relatively high drag torque is being applied to the vehicle wheels by the surface, increasing the amount of brake torque applied to one or more of the downhill wheels will cause the downhill wheels to dig or sink further into the surface than they otherwise would. As a result, a greater decelerating force is applied to the downhill wheels by the surface material, and thus, the vehicle decelerates more rapidly than it would had the amount of brake torque applied to the downhill wheels not been increased. This type of modification may be particularly applicable or well-suited in instances where a deceleration is commanded (via, for example, the brake pedal or by a speed control system of the vehicle) that is more rapid than a normal braking event, or a sudden change in the rate of deceleration is commanded to bring the vehicle is a standstill quickly.

In an embodiment wherein the brake torque may be modified by increasing the amount of brake torque applied to the downhill wheels and decreasing the amount applied to the uphill wheels, step 106 may comprise first determining whether such a modification is warranted (e.g., that a rapid deceleration is desired). If so, step 106 may further comprise determining which wheels of the vehicle are the uphill wheels and which are the downhill wheels, and modifying (or commanding the modification to) the amount brake torque being applied accordingly.

The initial determination of whether the modification is warranted may be performed in a number of ways. One way, though certainly not the only way, is by evaluating or monitoring one or more vehicle-related parameters. For example, the rate of deceleration of the vehicle may be monitored and if an increase is detected (or an increase that exceeds a given threshold), a determination can be made that a more rapid deceleration is being commanded. Other parameters that may additionally or alternatively be taken into account in the same or similar manner may include, but are not necessarily limited to, the amount of brake torque or brake pressure being commanded (e.g., via the brake pedal), the nature of the movement of the brake pedal (e.g., amount of displacement, rate of change of displacement, etc), and/or other suitable parameters. Accordingly, it will be appreciated that the present invention is not intended to be limited to the use of any particular parameter(s) and/or ways or techniques for determining whether the particular brake torque modification is warranted. In any event, the parameter(s) used may be determined and/or evaluated using techniques well known in the art.

If it is determined that the above-described modification is warranted, step 106 may comprise effecting the necessary modification. If, however, it is determined that such a modification is not warranted, step 106 may comprise modifying the brake torque according to a default modification (e.g., increasing the amount brake torque applied to the one or more of the uphill wheels and decreasing the amount applied to one or more of the downhill wheels), or no modification may be made (e.g., in an implementation that is not configured for any other possible modifications). In the latter instance, method 100 may terminate, loop back to a previous step (e.g., step 102), or may continue to monitor whether the modification is warranted.

In the event that the brake torque being applied to the uphill and/or downhill wheels of the vehicle is to be modified in step 106 in the manner described immediately above, the determination of which wheels of the vehicle are the uphill wheels and which are the downhill wheels must be made, and may be done so in a number of ways including, but not limited to, that described elsewhere above. Once it is determined which wheels are the uphill wheels and which are the downhill wheels, step 106 comprises modifying (or commanding the modification to) the brake torque being applied accordingly.

In addition to modifying or adjusting the brake torque applied the vehicle wheels or brake bias side-to-side, as is done in the embodiments described above, in certain instances it may be desirable to also modify or adjust the brake torque or brake bias forward-to-rearward (relative to the direction of travel) or vice versa. In other words, in certain implementations step 106 may further comprise increasing the amount of brake torque being applied to one or more forward wheels of the vehicle and decreasing the amount being applied to one or more rearward wheels, or vice versa. The result of such a modification is that the brake torque is biased towards either the forward or rearward wheels relative to the other.

Figure 7:
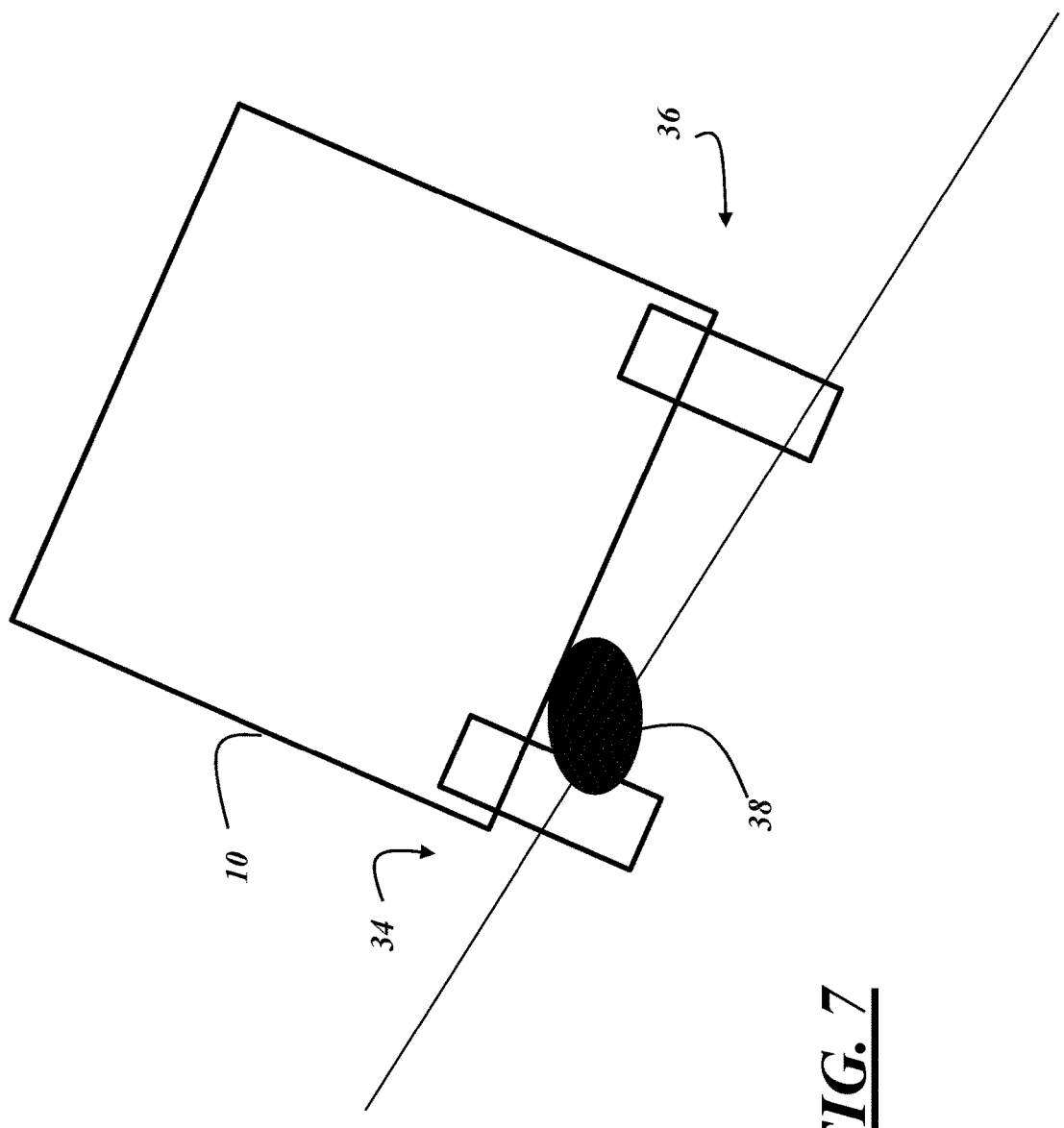

One reason that it may be desirable to modify the brake torque in this way is that in certain circumstances, such as, for example, when the slope the vehicle is traveling across exceeds a particular angle or severity and/or the surface thereof is of a particular type or nature (e.g., soft sand), the deceleration of the vehicle may cause the weight of the vehicle to be transferred not only to the downhill wheels, as described above, but also to the forward wheels. As a result, the forward wheels may dig or sink into the surface more than the rearward wheels, and the rearward end of the vehicle may slide or drop sideways in the downhill direction as illustrated in FIG. 6. Additionally or alternatively, as the vehicle decelerates, the effect of gravity and the nature of the surface/terrain may be such that the rearward end of the vehicle may begin to slide or drop down the slope in the same or similar manner to that described above. Increasing the amount of brake torque being applied to one or more of the rearward wheels (e.g., the uphill rearward wheel, the downhill rearward wheel, or both) may cause the rearward wheel(s) to dig or sink further than they typically would, thereby causing a build-up of surface material on the downhill side of that/those wheel(s) which provides more resistance to the rearward end sliding or dropping sideways down the slope. For example, and as shown in FIG. 7, in a particular instance wherein the amount of brake torque being applied to the uphill rearward wheel is increased, the build-up of surface material (represented by reference numeral 38) on the downhill side of that wheel (i.e., the inside of the wheel) combined with the downhill rearward wheel being higher in the surface material than the uphill rearward wheel results in a reduction in the inertia of the vehicle and in turn the yaw rate of the vehicle.

In an embodiment wherein the brake torque may be modified forward-to-rearward, or vice versa, step 106 may comprise first determining whether such a modification is warranted (e.g., the rearward end of the vehicle is sliding or dropping down the slope), and then modifying (or commanding the modification to) the brake torque being applied accordingly. The initial determination of whether the modification is warranted may be performed in a number of ways. One way, though certainly not the only way, is by evaluating or monitoring one or more vehicle-related parameters. For example, one or more electrical signals indicative of, or that may be used to derive, the yaw or yaw rate of the vehicle may be received from one or more vehicle sensors (e.g., a gyro sensor) and the yaw or yaw rate value may then be used to determine whether the rearward end of the vehicle is sliding/dropping down the slope. More particularly, in an embodiment, the yaw value may be compared to a predefined, empirically-derived threshold programmed into a memory device of a suitable vehicle component of the vehicle. If the yaw value is below (or, in an embodiment, meets or is below) the threshold a determination can be made that the rearward end of the vehicle is not sliding/dropping down the slope (or at least is not doing so in an unacceptable manner). Conversely, if the yaw value is above (or, in an embodiment, meets or is above) the threshold, a determination can be made that the rearward end of the vehicle is sliding/dropping down the slope, and therefore, that forward-to-rearward brake torque modification is warranted. It will be appreciated that while one example of a vehicle-related parameter and one example of a way of determining whether forward-to-rearward brake torque modification is warranted have been described, the present disclosure is not intended to be limited to the use of any particular parameter(s) or way(s). If it is determined that the above-described modification is warranted, step 106 may progress to effecting the modification. If, however, it is determined that it is not warranted, step 106 may comprise modifying the brake torque according to a default modification (e.g., increasing the amount brake torque applied to one or more of the uphill wheels and decreasing the amount applied to one or more of the downhill wheels), or no modification may be made. In the latter instance, method 100 may terminate, loop back to a previous step (e.g., step 102), or may continue to monitor whether the modification is warranted.

In another embodiment, the applied brake torque may be modified forward-to-rearward based on the axle experiencing the least amount of wheel slip. More particularly, the brake torque may be modified such that the amount of brake torque being applied to the axle experiencing the lowest level of wheel slip is increased, and the amount applied to the other axle is decreased.

Accordingly, it will be appreciated that the forward-to-rearward modification may take any number of forms (e.g., and therefore, the present invention is not intended to be limited to any particular modification(s).

It will be appreciated in view of the foregoing that the brake torque being applied to the wheels of vehicle 10 may be modified or adjusted in step 106 in any number of ways including, but not limited to, one or a combination of those described above. It will therefore be further appreciated that the present invention is not intended to be limited to any particular way(s) of modifying the brake torque.

In any event, the particular amount(s) by which the brake torque is modified in step 106 may be dependent upon any number of factors and, in at least some implementations, an empirically-derived profile or model programmed into a memory device of a suitable vehicle component that takes into account one or more of these factors may be used to determine the particular amount(s), rate(s), and duration(s) of the modification(s) to the brake torque being applied to one or more of the vehicle wheels. Some factors that may be utilized include, but are certainly not limited to, the grade or steepness of the slope the vehicle is traveling across (e.g., the steeper or more severe the slope, the greater the modification), the amount of brake torque or brake pressure being commanded by, for example, the driver (e.g., via the brake pedal) or, if applicable, a speed control system of the vehicle (e.g., LSP control system 28), the amount of brake torque or brake pressure being applied to the wheels of the vehicle, the actual speed of the vehicle (e.g., the slower the speed, the greater the modification), the attitude of the vehicle (e.g., roll, yaw, etc.), the requested rate of deceleration, the magnitude of the drag applied to the vehicle wheels by the surface of the terrain/slope, the steering angle of the steered wheels (e.g., the more the wheels are pointing down the slope, the more torque can be applied without the wheels digging or sinking too far into the surface), the vehicle weight, and the size and/or pressure of the vehicle tires, to cite a few possibilities. In other embodiments, rather than using a model to determine the amount(s) by what to modify the brake torque in step 106, one or more data structures may be used to determine the amount(s) by which the brake torque is modified. For example, values of one or more of the vehicle-related parameters identified above may be looked up in an empirically-derived look-up table that correlates that or those parameters with, for example, magnitudes of brake torque increase and/or reduction. Amounts by which to modify the brake torque being applied to at least certain of the vehicle wheels may then be determined. In yet other embodiments, control systems such as closed-loop control systems, or other equations or algorithms may be utilized. Accordingly, the present disclosure is not limited to any particular way(s) of determining amounts by which to modify the brake torque in step 106.

Regardless of the particular technique that is used to determine the amount(s) by which to modify the brake torque being applied to various wheels of the vehicle, in an embodiment, step 106 comprises modifying the amount brake torque being applied in such a way that the vehicle decelerates in accordance with an expected rate of deceleration (dictated by, for example, a particular brake command (e.g., a user- or driver-initiated brake command, for example, via the brake pedal 18 of the vehicle 10, or possibly a system or vehicle-initiated brake command initiated, for example, via a speed control system (e.g., the LSP control system 28)), which in one embodiment means decelerating the vehicle at the expected rate of deceleration, and in another embodiment means decelerating the vehicle at or within a predefined tolerance of the expected rate of deceleration, for example a tolerance having a value in the range of +/−0 to 5% of the expected rate. Additionally, in at least certain instances or implementations, the total amount of brake torque being applied to the wheels of the vehicle is not changed as a result of the modification in step 106; rather just the distribution of the total brake torque (or brake bias) amongst the vehicle wheels may be adjusted or modified. Accordingly, in such implementations, the total amount of brake torque being applied may be maintained at or within a certain tolerance of a level corresponding to, for example, a driver- or system-commanded brake command before and after the performance of step 106.

The actual modification of the amount of brake torque being applied to at least certain wheels of the vehicle, whether an increase or decrease, may be implemented or carried out in a number of ways well known in the art. In an illustrative embodiment the brake torque may be increased or decreased by increasing or decreasing, respectively, the amount of brake pressure in various portions of the vehicle brake subsystem $12_2$. For example, in an illustrative embodiment wherein the brake subsystem $12_2$ is a hydraulic-based system, step 106 may comprise controlling one or more electrically-actuated valves or actuators to control the pressure in the hydraulic fluid of the brake subsystem, which, therefore, results in an increase or decrease in the brake torque being applied to one or more of the vehicle wheel(s). It will be appreciated, however, that other techniques may additionally or alternatively be used instead (e.g., regenerative braking, if the brake subsystem is so configured).

It will be appreciated that while particular ways of performing or carrying out different parts or aspects of step 106 have been provided, the present invention is not intended to be limited to any particular ways of doing so; rather, suitable ways other than that or those described above may be utilized instead.

Additionally, the above described functionality of steps 104 and 106 may be performed by any suitable means, for example, an electronic processor configured to access a memory device and execute the instructions stored therein such that it is operable to perform the required functionality in whole or in part. In an embodiment, the electronic processor may comprise an electronic processor of brake subsystem $12_2$ (e.g., ABS controller) or another suitable component of vehicle 10.

Figure 4B:
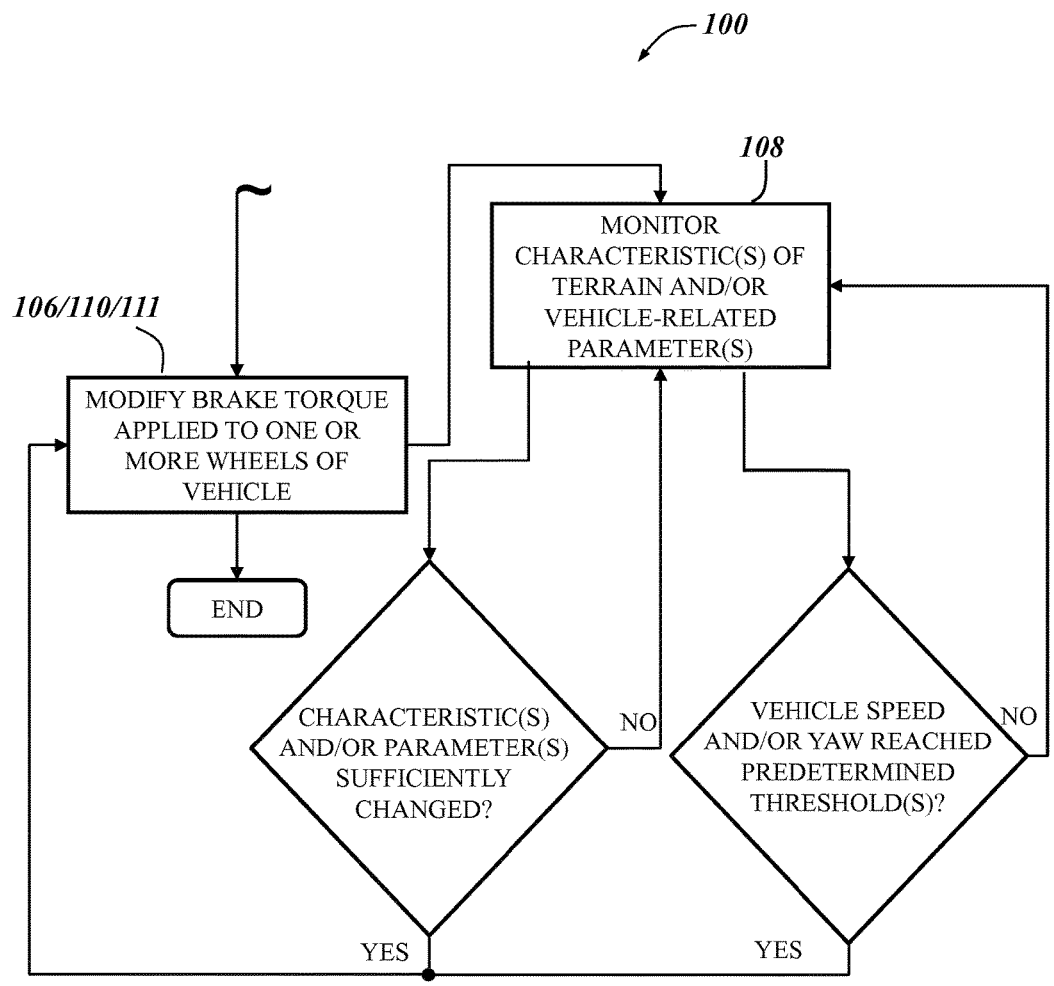

Following the modification to the brake torque in step 106, method 100 may include one or more additional steps, some or all of which may be optional. For example, and as shown in FIG. 4B, method 100 may include a step 108 of continuously monitoring characteristics or attributes of the terrain the vehicle traversing, for example and without limitation, the grade of the slope across which the vehicle is traveling, and/or one or more vehicle-related parameters, for example and without limitation, the speed of the vehicle and/or the yaw or yaw rate of the vehicle. These characteristics/parameters may be monitored in a number of ways. For example, the grade of the slope may be monitored by receiving one or more electrical signals, each of which is indicative of, or that may be used to derive, a value of the grade of the slope, directly or indirectly from an appropriately configured sensor 14 of vehicle 10 (e.g., a gradient sensor, a gyro sensor configured to measure or detect the pitch of the vehicle 10, etc.) or from another component of vehicle 10, for example, a subsystem 12 (e.g., chassis management and control subsystem $12_4$, etc.). The signal(s), or the values represented thereby, may then be processed (e.g., compared to previously acquired values) to determine whether the grade of the slope is increasing, decreasing, or remaining relatively constant. Vehicle-related parameters may be monitored in a similar manner. For example, the speed of the vehicle may be monitored by receiving one or more electrical signals, each of which is indicative of, or that may be used to derive, a value of the speed of the vehicle (or the vehicle wheels), directly or indirectly from an appropriately configured sensor 14 of vehicle 10 (e.g., a wheel speed sensor, vehicle speed sensor, etc.) or from another component of vehicle 10, for example, a subsystem 12 (e.g., powertrain subsystem $12_1$, etc.). The signal(s), or the values represented thereby, may then be processed (e.g., compared to previously acquired values) to determine whether the speed of the vehicle is increasing, decreasing, or remaining relatively constant, and/or to determine whether it has reached, exceeded, or fallen below a predetermined threshold. Similarly, the yaw or yaw rate of the vehicle may be monitored by receiving one or more electrical signals, each of which is indicative of, or that may be used to derive, a value of the yaw or yaw rate of the vehicle, directly or indirectly from an appropriately configured sensor 14 of vehicle 10 (e.g., a gyro sensor configured to detect the yaw or yaw rate of the vehicle) or from another component of vehicle 10, for example, a subsystem 12 (e.g., chassis management subsystem $12_4$, etc.). The signal(s), or the values represented thereby, may then be processed (e.g., compared to previously acquired values) to determine whether the yaw or yaw rate of the vehicle is increasing, decreasing, or remaining relatively constant, and/or to determine whether it has reached, exceeded, or fallen below a particular predetermined threshold.

In an embodiment, the functionality of step 108 may be performed by any suitable means, for example, an electronic processor that includes one or more electrical inputs for receiving electrical signals, including, for example, those described above, and that is configured to access a memory device and execute the instructions stored therein such that it is operable to perform the required functionality. In an embodiment, the electronic processor may comprise an electronic processor of brake subsystem $12_2$ (e.g., ABS controller) or another suitable component of vehicle 10. In an embodiment wherein method 100 includes step 108, method 100 may further include a step 110 of further modifying or adjusting (i.e., increasing or decreasing) (or commanding an modification or adjustment to) the amount of brake torque being applied to at least certain wheels of the vehicle as the relevant characteristic(s) of the terrain (e.g., grade of the slope) and/or the relevant vehicle-related parameter(s) (e.g., the speed and/or yaw of the vehicle) sufficiently change(s). For example, as the grade of the slope increases, the amount of brake torque being applied to the uphill wheels of the vehicle may be increased and the amount being applied to the downhill wheels may be decreased; while if the grade decreases, the amount of brake torque applied to the uphill wheels may be decreased and the amount applied to the downhill wheels may be increased. As the speed of the vehicle increases, the amount of torque being applied to the uphill wheels may be decreased and the amount applied to the downhill wheels may be increased (i.e., at higher speeds, the wheels are less likely to dig or sink (or dig or sink undesirably) into the surface); while if the speed decreases, the amount of brake torque applied to the uphill wheels may be increased and the amount applied to the downhill wheels may be decreased. Step 110 may be performed or carried out in the same or similar manner to that described above with respect to step 106, or in any other suitable manner; therefore, the description of step 106 set forth above will not be repeated but rather is incorporated here by reference.

With continued reference to FIG. 4B, in addition to or instead of step 110 described above, method 100 may also include a step 111 of further modifying or adjusting (i.e., increasing or decreasing) (or commanding a modification or adjustment to) the amount of brake torque being applied to at least certain wheels of the vehicle when one or more vehicle-related parameters has/have reached one or more respective thresholds. For example, in an embodiment, step 111 may comprise modifying the amount of brake torque being applied when the vehicle has reached (or fallen below) a predetermined threshold speed. In another embodiment, step 111 may comprising modifying the amount of brake torque when the yaw or yaw rate of the vehicle has reached (or exceeded) a predetermined threshold yaw or yaw rate value. In an embodiment wherein the vehicle speed and/or yaw is utilized in this manner, step 108 comprises comparing the actual speed and/or yaw values to corresponding threshold(s). In an implementation wherein the speed is compared to a corresponding threshold, the threshold value may be the lowest speed at which the component(s) performing step 108 is able to accurately measure, which may be on the order of 2 kph (i.e., around 1 mph); though other threshold speeds may certainly be used. In an implementation wherein the yaw or yaw rate of the vehicle is compared to a corresponding threshold, the threshold value may be a predetermined, empirically-derived value that is indicative of the vehicle being in the final stages of braking (i.e., just before the vehicle comes to a stop). In any event, if it is determined that the relevant vehicle-related parameter(s) has/have not reached the corresponding threshold(s), method 100 may continue monitoring the parameter(s) in step 108. If, however, the parameter(s) has/have reached the corresponding threshold(s), method 100 may move on to step 111 described below.

As briefly described above, step 111 comprises automatically modifying or adjusting (or commanding a modification or adjustment to) the amount of brake torque being applied to one or more wheels of the vehicle. In at least some implementations, this may comprise decreasing the amount of brake torque being applied to one or more of the downhill wheels of the vehicle, and in some implementations, the modification may also include an increase in the amount of brake torque being applied to one or more of the uphill wheels of the vehicle. The intended effect of the modification in step 111 is to allow the downhill wheel(s) of the vehicle to ride up and out of the depression(s) in the surface material in which the wheel(s) is/are in prior to step 111 being performed. As a result, the amount of vehicle roll is reduced and the vehicle more level than it otherwise would be if step 111 were not performed. Additionally, the amount of yaw experienced by the vehicle as it decelerates may also be reduced or at least maintained or at a fairly constant level. In some implementations, the timing of the modification in step 111 is such that it occurs immediately before the vehicle comes a stop or standstill, for example, in the last revolution, or half revolution of the tire (i.e., the vehicle only needs to travel a final foot or so to ride up and on top of the surface material); though in other implementations, step 111 may be performed at a different point during the brake event. And as with step 110 described above, step 111 may be performed or carried out in the same or similar manner to that described above with respect to step 106, or in any other suitable manner; therefore, the description of step 106 set forth above will not be repeated but rather is incorporated here by reference. As with other steps of method 100, the above described functionality of steps 110 and 111 may be performed by any suitable means, for example, an electronic processor configured to access a memory device and execute the instructions stored therein such that it is operable to perform the required functionality in whole or in part. In an embodiment, the electronic processor may comprise an electronic processor of brake subsystem $12_2$ (e.g., ABS controller) or another suitable component of vehicle 10.

Figure 4C:
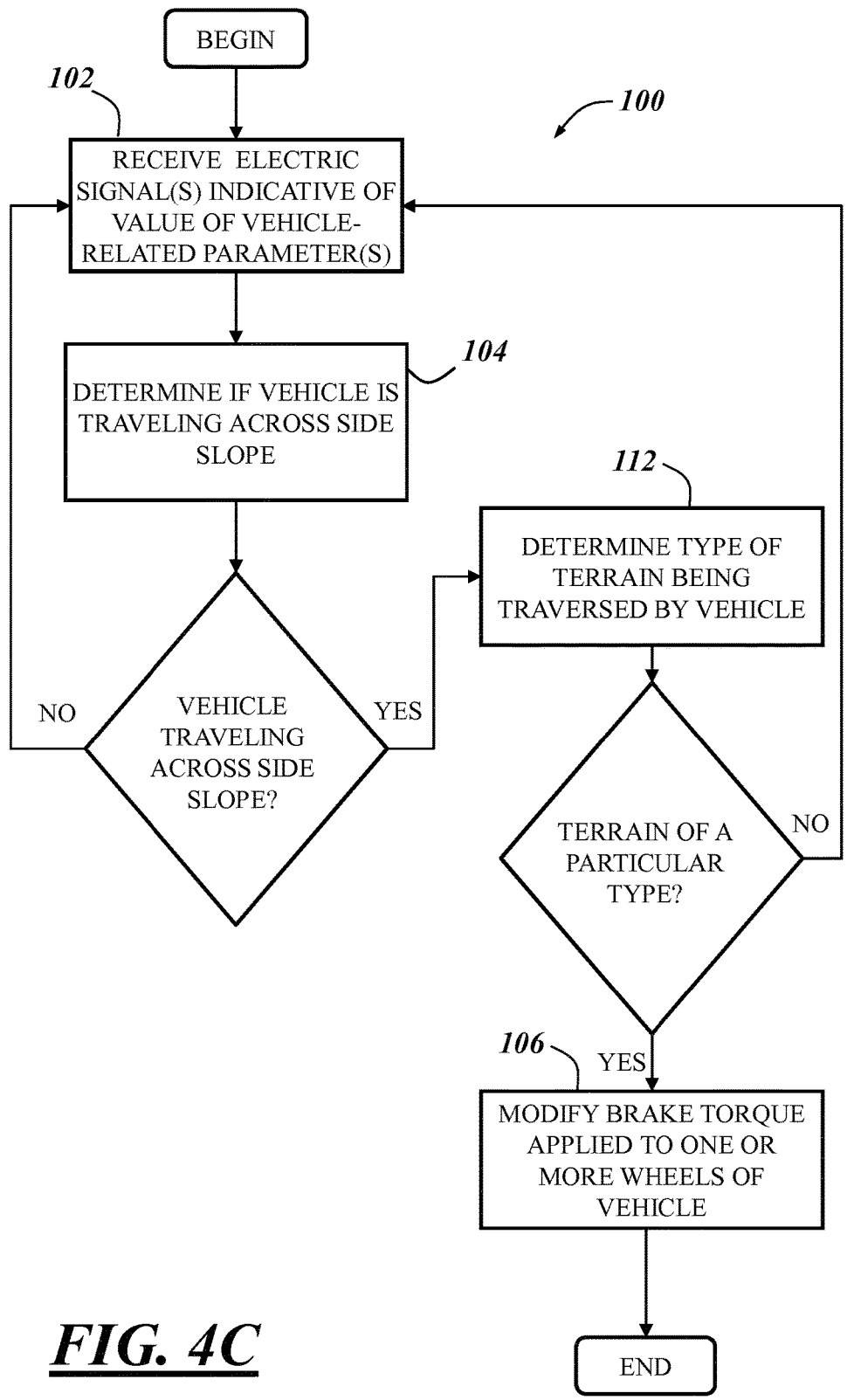

Whether or not method 100 includes any of optional steps 108, 110, and 111, in some embodiments or implementations, method 100 may optionally include one or more additional steps that may be used to determine whether one or more steps of method 100 (e.g., step 106) should even be performed. As illustrated in FIG. 4C, one such step, step 112, comprises determining the type of terrain the vehicle is traversing and then determining whether the prevailing terrain is one deemed to be well-suited for the functionality of method 100. In an embodiment wherein method 100 includes step 112, method 100 may comprise performing one or more of the above-described steps (e.g., steps 102, 104, and/or 106) only if the terrain determined in step 112 is one of one or more particular types of terrain, for example, sand. Accordingly, in an embodiment, step 112 may comprise comparing the determined, prevailing terrain type with one or more particular terrain types stored in, for example, a data structure (e.g., look-up table). If the prevailing terrain type does, in fact, match one of the predefined terrain types, then it may be determined in step 112 that method 100 may proceed to a subsequent step, for example, step 106; otherwise, it may be determined that a subsequent step should not be performed and method 100 may return to, for example, step 102 (as shown in FIG. 4C) or terminate altogether. The functionality described herein may be particularly suited for any number of terrain types, and therefore, the predefined terrain types to which the prevailing terrain type is compared may include any number of different terrain types. In an embodiment, these terrain types may include, for example, those having a deformable, low-mu surface, for example and without limitation, sand, mud, gravel, and wet grass. In one specific embodiment, method 100 may only be performed if it is determined that the vehicle is driving on sand, and optionally that it is driving on a particular type of sand, for example dry sand which may be determined by the coefficient of surface friction of the terrain.

Determining the type of terrain may be performed in a number of ways. For example, in an embodiment, the terrain type may be determined automatically in the manner described in detail above with respect to LSP control system 28. For example, information relating to a variety of different vehicle-related parameters may be acquired from a plurality of vehicle sensors (e.g., sensors 14) and/or various vehicle subsystems (e.g., subsystems 12). The acquired information may then be evaluated and used to determine the terrain type. An additional or alternative way the terrain type may be determined is in response to a user input representative of a particular terrain type. A vehicle occupant may provide this input using a suitably configured user interface device, for example, a user interface device of the speed control system (e.g., one of user input devices 44 of LSP control system 28 described above and illustrated in FIG. 3), or another user interface device located within the vehicle cabin, for example, a knob, switch, pushbutton, touch screen display, or other suitable device that allows for the selection of a terrain type from one or a plurality of different terrain types. Accordingly, it will be appreciated that any number of techniques may be used to determine a terrain type, and therefore, the present invention is not intended to be limited to any particular technique(s) for doing so. In an instance wherein the terrain type is determined by a component or subsystem of vehicle 10 that is different than that configured to perform other steps of method 100, the determination may be communicated to that other component.

As briefly described above, once the prevailing terrain type is determined, step 112 may further include determining whether that terrain type is one of one or more terrain types for which it has been predefined that the method 100 is well-suited. Accordingly, step 112 may further comprise comparing the prevailing terrain type with one or more predefined terrain types stored in, for example, a data structure (e.g., look-up table). If the prevailing terrain type does, in fact, match one of the predefined terrain types, then it may be determined in step 112 that method 100 may proceed to a subsequent step, for example, step 106; otherwise, it may be determined that a subsequent step should not be performed, and method 100 may return to, for example, step 102, or simply terminate. While in the embodiment described above step 106 is performed only if certain criteria are met, in other embodiments step 112 may be performed prior to any one of the other steps of method 100 described above (e.g., steps 102, 104, or 108), and that or those steps may be performed only if prevailing terrain type does, in fact, match one of the predefined terrain types. Accordingly, the present disclosure is not limited to step 112 being performed in any particular sequence relative to the other steps of method 100.

In an embodiment, the functionality of step 112 described above may be performed by one or a combination of components/subsystems of vehicle 10, for example, a combination of LSP control system 28 and brake subsystem 12₂ (e.g., the electronic controller(s) thereof) or one or more other suitable component(s) of vehicle 10.

Figure 4D:
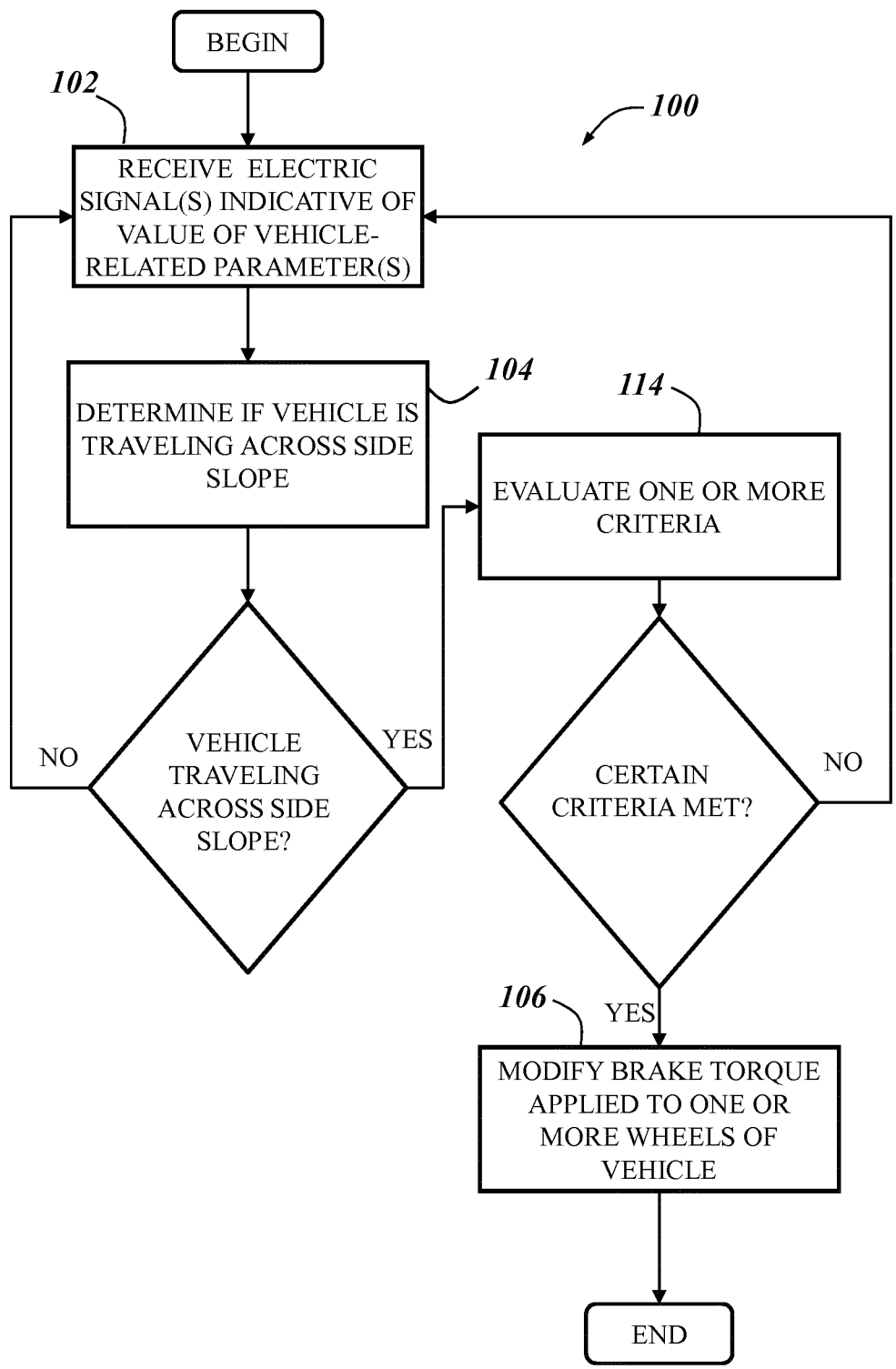

Similar to step 112, and as shown in the embodiment illustrated in FIG. 4D, method 100 may additionally or alternatively include a step 114 of evaluating one or more criteria to determine whether to modify the brake torque being applied to the wheels of the vehicle in step 106. Any number of criteria may be evaluated in step 114 including, but certainly not limited to, one or more of those described herein. For example, in some implementations, it may be desirable to perform some or all of the steps of method 100 only at relatively low vehicle speeds. Accordingly, one criterion may be that the speed of the vehicle is below (or has fallen below) a predefined threshold value. In an embodiment wherein such a criterion is to be evaluated, one or more electrical signals indicative of, or that may be used to derive, a value of the vehicle speed may be received and interpreted to determine the speed of the vehicle 10. This value may then be compared to a predefined threshold, which may be, for example and without limitation, a value between 0-20 kph (i.e., about 0-12 mph), and in an illustrative embodiment, between 5-15 kph (i.e., about 3-9 mph). The threshold value may be an empirically-derived value that is programmed into a memory device of a suitable vehicle component. If the vehicle speed is below the threshold, a determination can be made that this criterion is met; otherwise it can be determined that it is not.

Another criterion that may be evaluated relates to the grade of the slope the vehicle is traveling across. More particularly, in some implementations, it may be desirable to perform some or all of the steps of method 100 only when the slope is of at least a certain grade. Accordingly, one criterion may be that the grade of the slope be above a predefined threshold. In an embodiment wherein such a criterion is to be evaluated, one or more signals indicative of, or that may be used to derive, a value of the grade of the slope may be received from one or more vehicle sensors 14 (e.g., gyro sensor(s), gradient sensor(s), etc.) or another component of vehicle 10 (e.g., a subsystem 12), and may be interpreted to determine the grade of the slope. The prevailing grade may then be compared to the predefined threshold, which may be for example and without limitation, a value between 0-15%, and in an embodiment, between around 5-10%. The threshold may be an empirically-derived value that is programmed into a memory device of a suitable vehicle component. If, as described above, the grade of the slope is above (or, in an embodiment, meets or is above) the threshold, a determination can be made that this criterion is met; otherwise it can be determined that it is not.

Yet another criterion that may be evaluated relates to the nature of the braking being commanded. More particularly, in some implementations, it may be desirable to perform some or all of the steps of method 100 only if at least a certain amount or a particular type of braking is being commanded (i.e., a commanded brake torque or pressure below a certain threshold and/or the "feathering" of the brakes may result in the functionality of some or all of the steps of method 100 not being performed). Accordingly, one criterion may be that the magnitude of the brake torque or pressure being commanded be above a predefined threshold. In an embodiment wherein such a criterion is to be evaluated, one or more signals indicative of, or that may be used to derive, a value of the commanded brake torque or pressure may be received from one or more vehicle sensors 14 or another component of vehicle 10 (e.g., a subsystem 12), and may be interpreted to determine the commanded brake torque or pressure. The prevailing brake torque or pressure may then be compared to the predefined threshold. The threshold may be an empirically-derived value that is programmed into a memory device of a suitable vehicle component. If, as described above, the magnitude of the brake torque or pressure is above (or, in an embodiment, meets or is above) the threshold, a determination can be made that this criterion is met; otherwise it can be determined that it is not.

While only a few criteria were described in detail above, it will be appreciated that criteria in addition to or instead of those described above may be evaluated and used in the same or similar manner as that described herein. Accordingly, the present invention is not limited to the use of any particular criteria.

In an embodiment wherein method 100 includes step 114, and depending on the particular implementation of method 100, step 106 may be performed only if at least a certain number (e.g., all or less than all (for example, a majority)) or certain one(s) of the evaluated criteria are met or satisfied. Accordingly, in an instance wherein the appropriate criteria or number of criteria is/are met, method 100 may proceed to step 106; otherwise, method 100 may loop back to a previous step, for example, step 102 (as shown in FIG. 4D), or may simply terminate. While in the embodiment described above step 114 is performed immediately before step 106, and step 106 is performed only if certain criteria are met, in other embodiments step 114 may be performed prior to any one of the other steps of method 100 described above (e.g., steps 102 or 104). In such embodiments, the step immediately following step 114 would be performed only if the appropriate criteria is/are met or satisfied. Accordingly, the present disclosure is not limited to step 114 being performed in any particular sequence relative to the other steps of method 100.

The above described functionality of step 114 may be performed by any suitable means, for example, an electronic processor configured to access a memory device and execute the instructions stored therein such that it is operable to perform the required functionality in whole or in part. In an embodiment, the electronic processor may comprise an electronic processor of brake subsystem $12_2$ (e.g., ABS controller) or another suitable component of vehicle 10.

Figure 8:
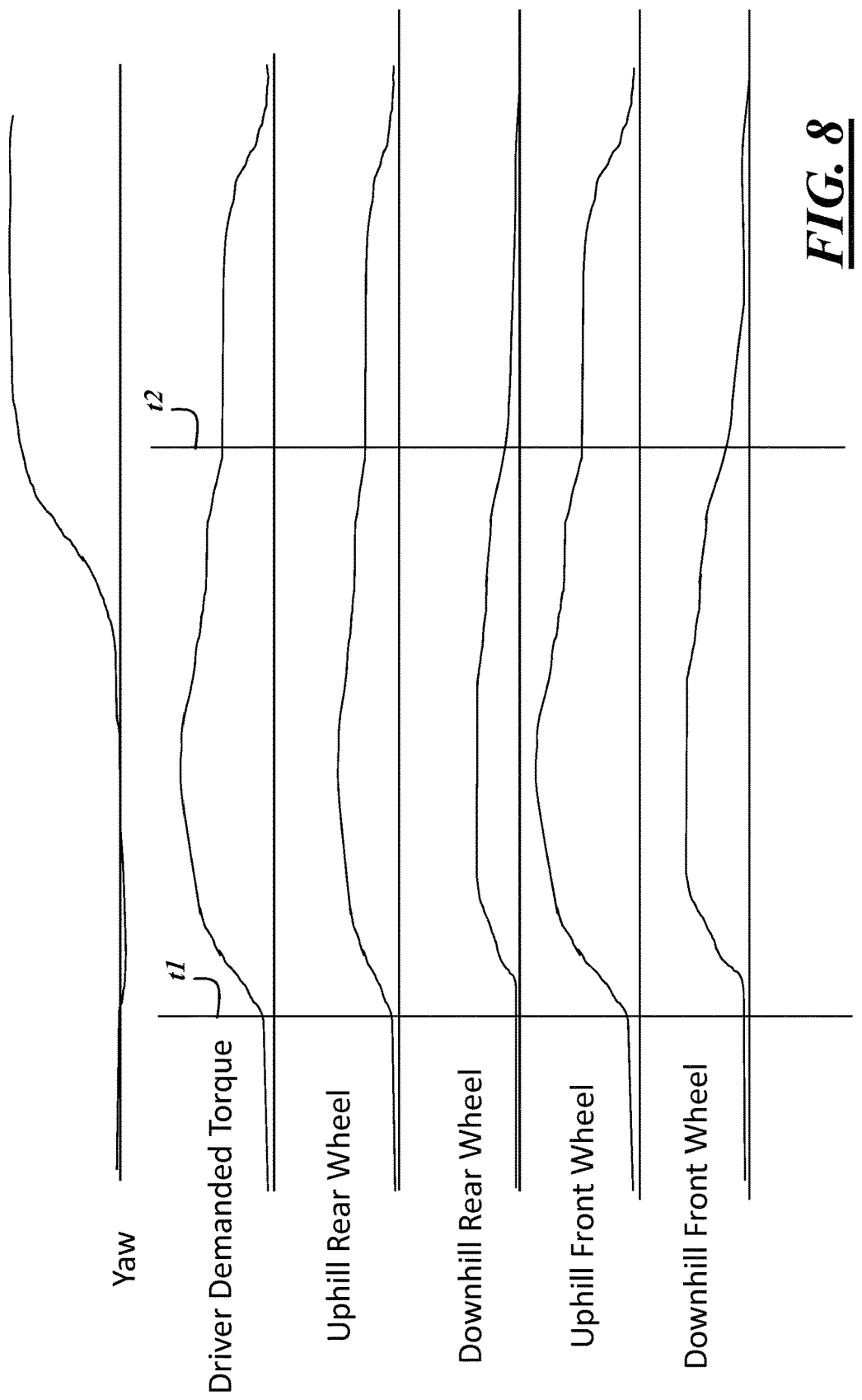
FIG. 8 is a graphical representation of representation of an example of the deceleration of a vehicle and the brake torque being applied to the different wheels thereof as the vehicle decelerates whilst traversing a side slope having a low-mu deformable surface.

With reference to FIG. 8, in order to provide a better understanding of various aspects and embodiments of the present invention described above, a non-limiting example of an implementation of method 100 will now be described to illustrate the application of some or all of the above-described aspects. FIG. 8 depicts a number of plots or traces of certain parameters over time for a given brake event corresponding to a vehicle traveling across a slope. More particularly, FIG. 8 includes a "yaw" trace corresponding to the yaw of the vehicle as the vehicle decelerates, a driver demanded brake torque trace corresponding to the amount of brake torque being demanded or commanded by the driver as the vehicle decelerates, and a series of traces corresponding to the amount of brake torque being applied to each of the front and rear wheels on each of the uphill and downhill sides of the vehicle.

As shown, at the beginning of the brake event, and after detecting that the vehicle is traveling across a slope, the amount of brake torque being applied to the wheels of the vehicle is biased towards the uphill wheels of the vehicle (i.e., a greater amount of brake torque is applied to the uphill wheels than is applied to the downhill wheels). In other words, the amount of brake torque being applied to the wheels of the vehicle is modified or adjusted from an equal distribution to a biased arrangement by increasing the amount of brake torque being applied to the uphill wheels and decreasing the amount being applied to the downhill wheels (step 106). As the driver demanded brake torque increases starting at time t1, the amount of brake torque being applied to the uphill and downhill wheels increases, as does the amount or degree of bias towards the uphill wheels (i.e., there is a greater bias towards the uphill wheels as compared to before time t1). As the vehicle continues to decelerate between time t1 and time t2, which is a point of time at or near the end of the brake event for example immediately before the vehicle comes to a standstill, the brake torque may remain biased towards the uphill wheels, however, the degree to which it is biased toward the uphill wheels may decrease due to, for example, a change in vehicle speed, a change in the grade of the slope, etc. (step 110) (i.e., there is less bias towards the uphill wheels as compared to just after time t1). At time t2, which again is just before the vehicle comes to a standstill (e.g., the last revolution or half revolution of the wheels), and as the yaw of the vehicle increases, the amount of brake torque being applied to the downhill wheels of the vehicle may be decreased, once again resulting in an increase in the brake bias towards the uphill wheels of the vehicle to allow the downhill wheels to roll up and out of a depressions in the surface material. This, in turn, results in a reduction in the roll of the vehicle, and thus, the vehicle being more level than it otherwise would be, and the leveling off of the yaw of the vehicle as the vehicle comes to a standstill. Stated differently, in the implementation illustrated in FIG. 8, at time t2 the amount of brake torque being applied to the downhill wheels is reduced sooner and quicker than that being applied to the uphill wheels. It will be appreciated in view of the above that a benefit or advantage of at least some embodiments or implementations of the present invention, among potentially others, is that in an instance wherein a vehicle is traveling across a side slope having a deformable, low-mu surface (e.g., sand, gravel, wet grass, or mud) and is being decelerated, the distribution of the brake torque in the vehicle brake subsystem is automatically adjusted or modified by increasing the amount of brake torque being applied to one or more wheels on one side of the vehicle and decreasing the amount being applied to one or more wheels on the other side of the vehicle. As a result, the extent to which one or more wheels of the vehicle dig(s) or sink(s) into the surface of the terrain may be effectively controlled to, for example, limit the roll or roll rate of the vehicle toward the downhill side, eliminate or at least limit the sliding of the vehicle sideways down the slope, and/or eliminate or at least limit the amount of material that builds up around the wheels of the vehicle as the vehicle comes to a stop. As a result, the composure of the vehicle may be substantially maintained as the vehicle decelerates to a stop or standstill, and it may be easier for the vehicle to subsequently pull away in a composed manner (e.g., with more longitudinal movement and less lateral movement).

It will be understood that the embodiments described above are given by way of example only and are not intended to limit the invention, the scope of which is defined in the appended claims. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Further, the terms "electrically connected" or "electrically coupled" and the variations thereof are intended to encompass both wireless electrical connections and electrical connections made via one or more wires, cables, or conductors (wired connections). Other terms are to be construed using their broadest reasonable meaning unless they are used in a context that requires a different interpretation.

The invention claimed is:

1. A method of controlling the operation of a brake system of a vehicle when driving on a deformable surface, the vehicle having a front, rear and two sides, the method comprising:
   receiving one or more electrical signals each indicative of a value of a respective vehicle-related parameter;
   detecting that the vehicle is traversing a side slope such that one side of the vehicle is uphill and the other side is downhill, based on the value(s) of one or more of the vehicle-related parameter(s); and
   controlling an extent to which the forward and rearward wheels on the downhill side of the vehicle dip into the deformable surface as the vehicle decelerates to a stop by automatically modifying the amount of brake torque being applied to at least certain of the wheels of the vehicle in response to the detection of the vehicle traversing a side slope by increasing the amount of brake torque being applied to forward and rearward wheels on the uphill side of the vehicle, and decreasing the amount of brake torque being applied to forward and rearward wheels on the downhill side of the vehicle.

2. The method of claim 1, wherein the modifying step comprises:
   increasing the amount of brake torque being applied to one or more forward wheels of the vehicle and decreasing the amount of brake torque being applied to one or more rearward wheels of the vehicle; or
   decreasing the amount of brake torque being applied to one or more forward wheels of the vehicle and increasing the amount of brake torque being applied to one or more rearward wheels of the vehicle.

3. The method of claim 1, comprising:
   evaluating one or more criteria to determine whether to modify the amount of brake torque being applied to at least certain of the vehicle wheels; and
   modifying the amount of brake torque being applied to at least certain of the vehicle wheels when at least one of the criteria are met.

4. The method of claim 3, wherein the one or more criteria comprise one or more of:
   the gradient of the slope being above a predetermined threshold;
   the speed of the vehicle being below a predetermined threshold;
   the magnitude of the commanded brake torque being above a predetermined threshold; or
   the terrain the vehicle is traversing being one of one or more particular terrain types.

5. The method of claim 1, further comprising:
   determining the type of terrain the vehicle is traversing; and
   modifying the amount of brake torque being applied to at least certain of the vehicle wheels when the terrain is one of one or more particular terrain types.

6. The method of claim 5, wherein determining the terrain type comprises receiving a user input indicative of the terrain type.

7. The method of claim 5, wherein determining the terrain type comprises automatically determining the terrain type.

8. The method of claim 4, wherein the one or more particular terrain types correspond to terrains having a deformable surface.

9. The method of claim 4, wherein the one or more particular terrain types comprises at least one of sand, gravel, mud, or grass.

10. The method of claim 1, wherein after the modifying of the amount of brake torque, the method comprises:
    continuously monitoring at least one of the gradient of the slope across which the vehicle is traveling or the speed of the vehicle; and
    modifying the amount of brake torque being applied to at least certain of the vehicle wheels as one or both of the gradient of the slope and the speed of the vehicle change(s).

11. The method of claim 1, wherein after the modifying of the amount of brake torque, the method comprises:
    monitoring a vehicle-related parameter as the vehicle decelerates; and
    when the vehicle-related parameter reaches a predetermined threshold, automatically modifying the amount of brake torque being applied to one or more wheels of the vehicle by decreasing the amount of brake torque being applied to one or more wheels on the downhill side of the vehicle.

12. A non-transitory, computer-readable storage medium storing instructions thereon that when executed by one or more electronic processors causes the one or more electronic processors to carry out the method of claim 1.

13. A system for controlling the operation of a brake system of a vehicle when driving on a deformable surface, the vehicle having a front, rear and two sides, the system comprising:
    means for receiving one or more signals each indicative of a value of a respective vehicle-related parameter;
    means to detect that the vehicle is traversing a side slope such that one side of the vehicle is uphill and the other side is downhill, based on the value(s) of one or more of the vehicle-related parameter(s); and
    means to control an extent to which the forward and rearward wheels on the downhill side of the vehicle dip into the deformable surface as the vehicle decelerates to a stop by commanding a modification in the amount of brake torque being applied to at least certain of the wheels of the vehicle in response to the detection of the vehicle traversing a side slope by commanding an increase in the amount of brake torque being applied to forward and rearward wheels on the uphill side of the vehicle, and a decrease in the amount of brake torque being applied to forward and rearward wheels on the downhill side of the vehicle.

14. The system of claim 13, wherein the receiving means, detecting means, and controlling means comprise:
    an electronic processor having an electrical input for receiving the one or more signals indicative of the value(s) of the vehicle-related parameter(s); and
    an electronic memory device electrically coupled to the electronic processor and having instructions stored therein,
    wherein the processor is configured to access the memory device and execute the instructions stored therein such that it is operable to:
      detect that the vehicle is traversing a side slope based on the value(s) of one or more of the vehicle-related parameters; and
      control an extent to which the forward and rearward wheels on the downhill side of the vehicle dig into the deformable surface as the vehicle decelerates to a stop by commanding a modification to the amount of brake torque being applied to at least certain of the wheels of the vehicle by commanding an increase in the amount of brake torque being applied to forward and rearward vehicle wheels on the uphill side of the vehicle, and a decrease in the amount of brake torque being applied to forward and rearward wheels on the downhill side of the vehicle.

15. The system of claim 14, wherein the processor is operable to command:
an increase in the amount of brake torque being applied to one or more forward wheels of the vehicle, and a decrease in the amount of brake torque being applied to one or more rearward wheels of the vehicle; or
a decrease in the amount of brake torque being applied to one or more forward wheels of the vehicle, and an increase in the amount of brake torque being applied to one or more rearward wheels of the vehicle.

16. The system of claim 14, wherein the processor is operable to:
evaluate one or more criteria to determine whether to command a modification to the amount of brake torque being applied to at least certain of the vehicle wheels; and
command a modification to the amount of brake torque being applied to at least certain of the vehicle wheels when at least one of the criteria are met.

17. A vehicle comprising the system according to claim 13.

18. An electronic controller for a vehicle, the vehicle having a front, rear and two sides, the controller having a storage medium associated therewith storing instructions that when executed by the controller causes the control of the operation of a brake system of a vehicle when driving on a deformable surface in accordance with the method of:
receiving one or more electrical signals each indicative of a value of a respective vehicle-related parameter;
detecting that the vehicle is traversing a side slope such that one side of the vehicle is uphill and the other side is downhill, based on the value(s) of one or more of the vehicle-related parameter(s); and
controlling an extent to which the forward and rearward wheels on the downhill side of the vehicle dip into the deformable surface as the vehicle decelerates to a stop by automatically modifying the amount of brake torque being applied to at least certain of the wheels of the vehicle in response to the detection of the vehicle traversing a side slope by increasing the amount of brake torque being applied to forward and rearward wheels on the uphill side of the vehicle, and decreasing the amount of brake torque being applied to forward and rearward wheels on the downhill side of the vehicle.

* * * * *